United States Patent [19]

Mosby et al.

[11] Patent Number: 5,013,427
[45] Date of Patent: May 7, 1991

[54] RESID HYDROTREATING WITH RESINS

[75] Inventors: James F. Mosby, Burr Ridge, Ill.; Lawrence B. Peck, Houston, Tex.; James L. Taylor, Naperville; William I. Beaton, Wheaton, both of Ill.

[73] Assignee: Amoco Corportion, Chicago, Ill.

[21] Appl. No.: 381,372

[22] Filed: Jul. 18, 1989

[51] Int. Cl.⁵ .............................................. C10G 1/00
[52] U.S. Cl. ................................... 208/211; 208/39;
  208/86; 208/87; 208/92; 208/96; 208/108;
  208/212; 208/143; 208/208; 208/211.2;
  208/251 H; 208/61; 208/309; 208/254 H
[58] Field of Search ...................... 208/39, 86, 87, 92,
  208/96, 108, 212, 143, 208, 211, 251 H, 254 H, 61

[56] References Cited

U.S. PATENT DOCUMENTS

| | | | |
|---|---|---|---|
| 3,306,840 | 2/1967 | Myers et al. | 208/108 |
| 4,435,277 | 3/1984 | Dink et al. | 208/108 |
| 4,808,298 | 2/1984 | Peck et al. | 208/212 |
| 4,946,529 | 7/1990 | Beaton | 208/61 |

*Primary Examiner*—Helane E. Myers
*Attorney, Agent, or Firm*—Thomas W. Tolpin; William H. Magidson; Ralph C. Medhurst

[57] ABSTRACT

A hydrotreating process if provided in which resid and resins are hydrotreated with hydrogen-rich gases in the presence of a hydrotreating catalyst in an ebullated bed reactor.

20 Claims, 7 Drawing Sheets

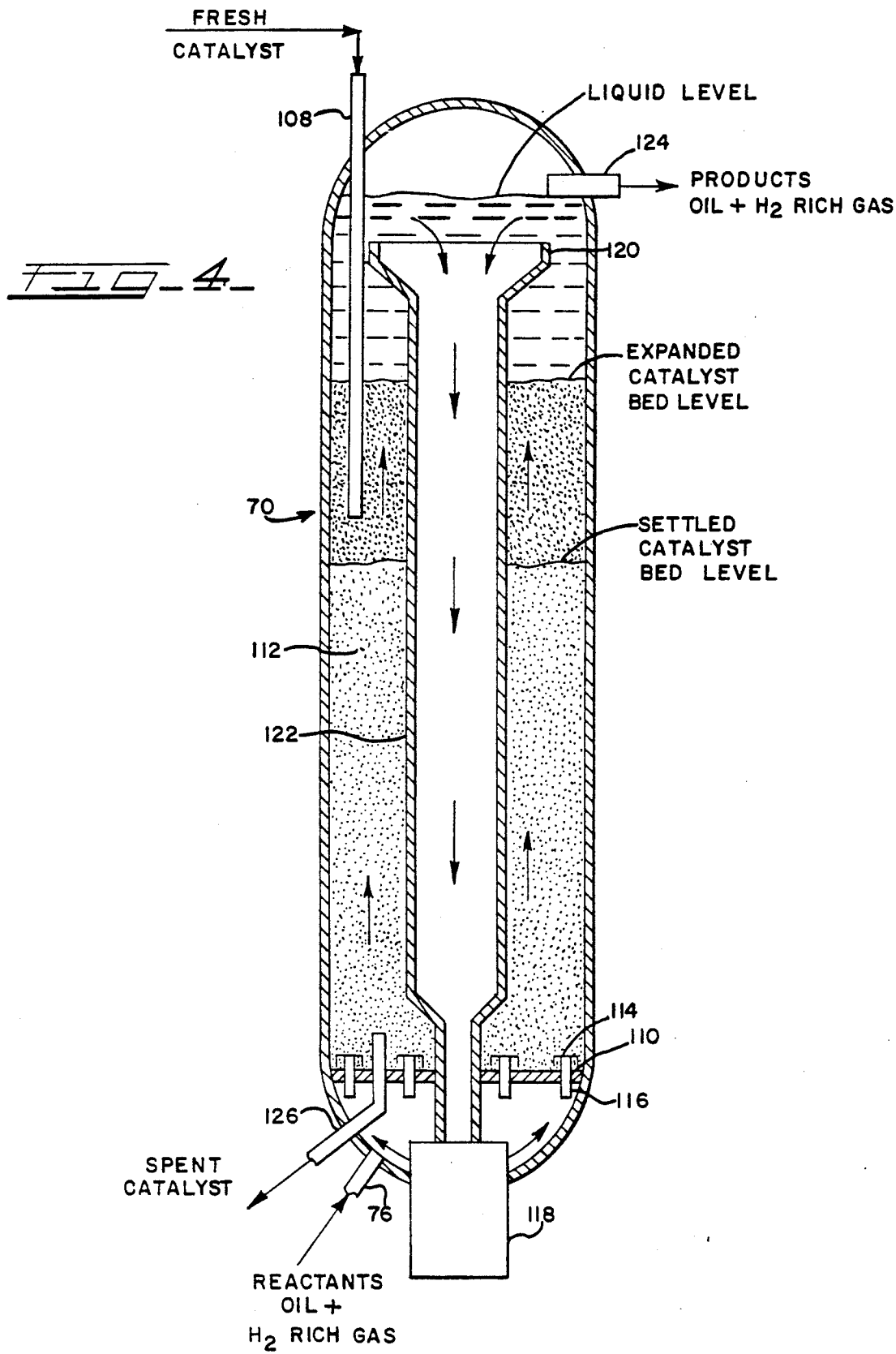

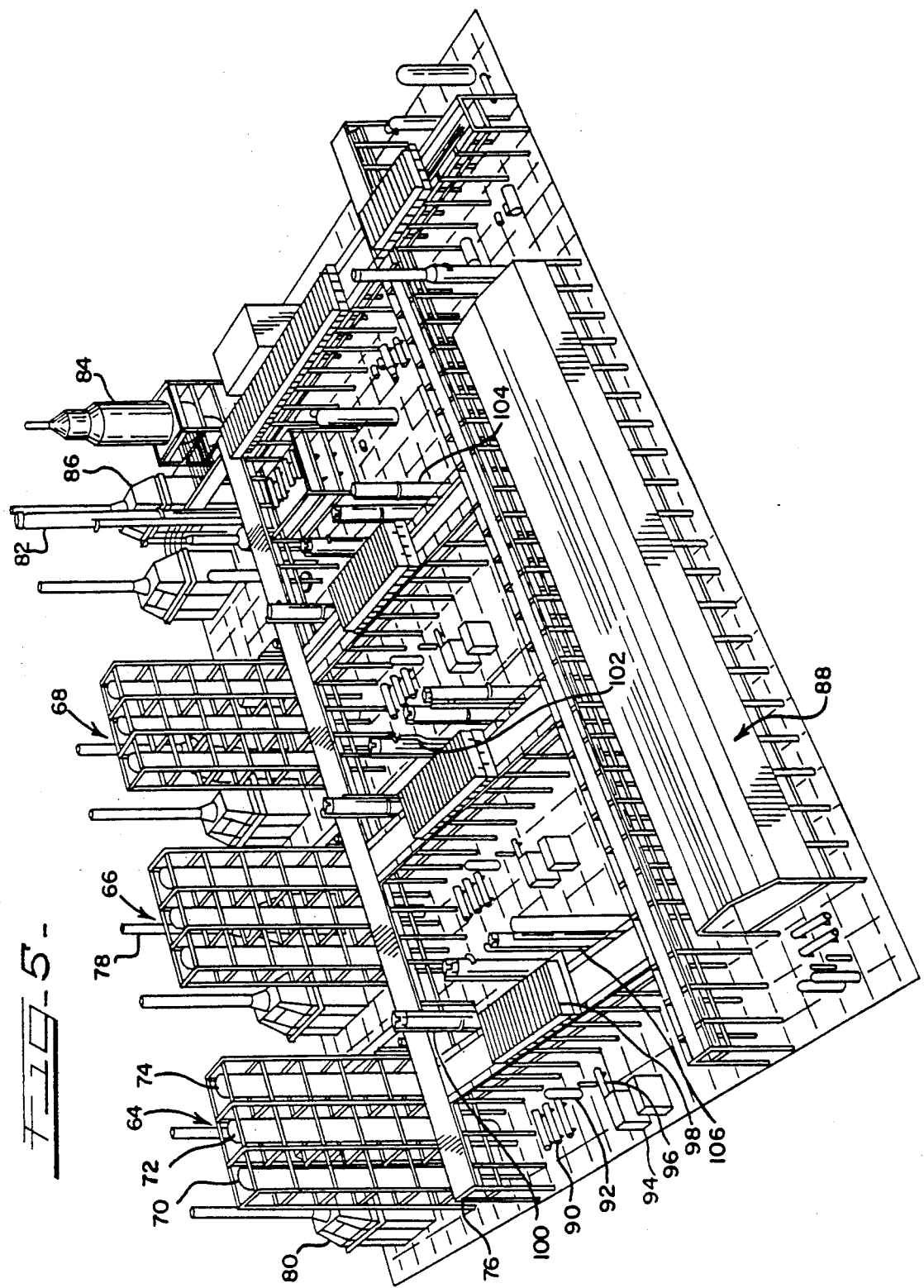

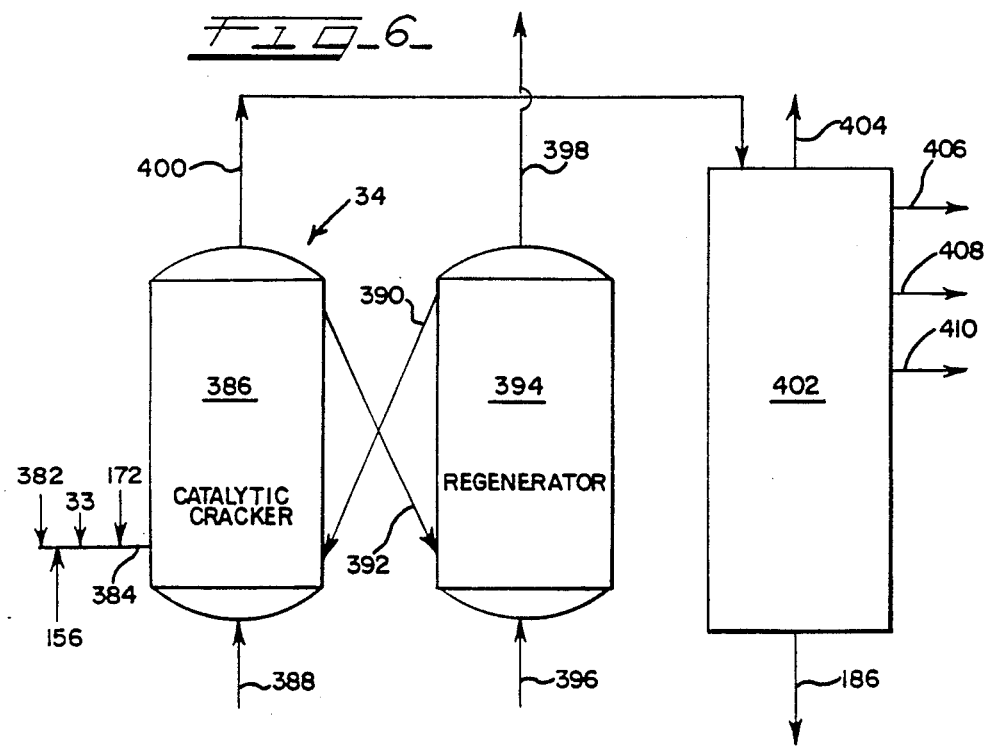
FIG-6-
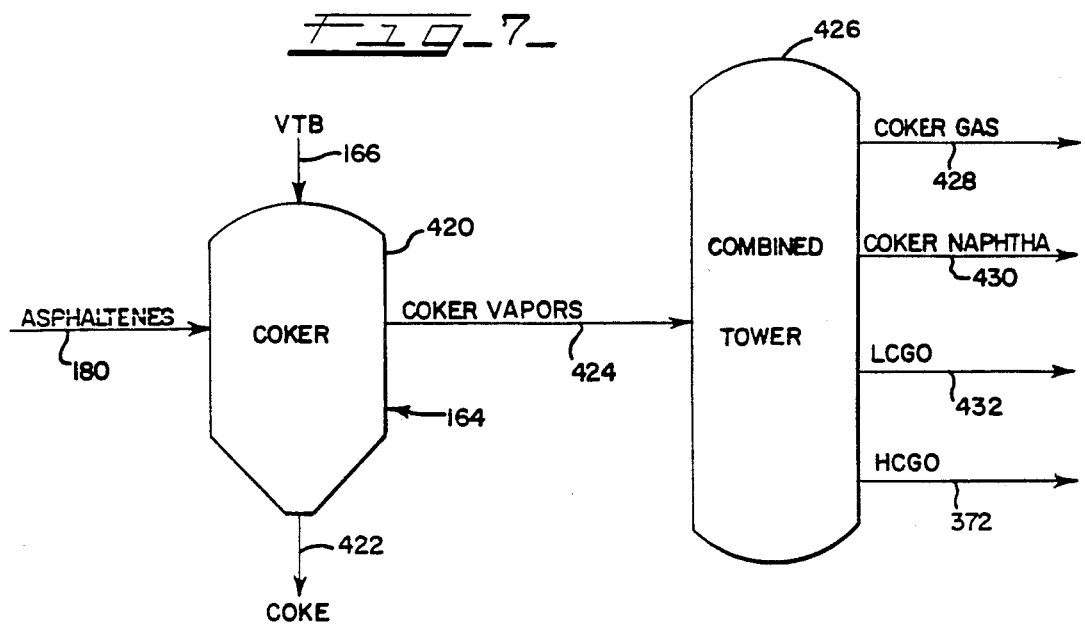
FIG-7-

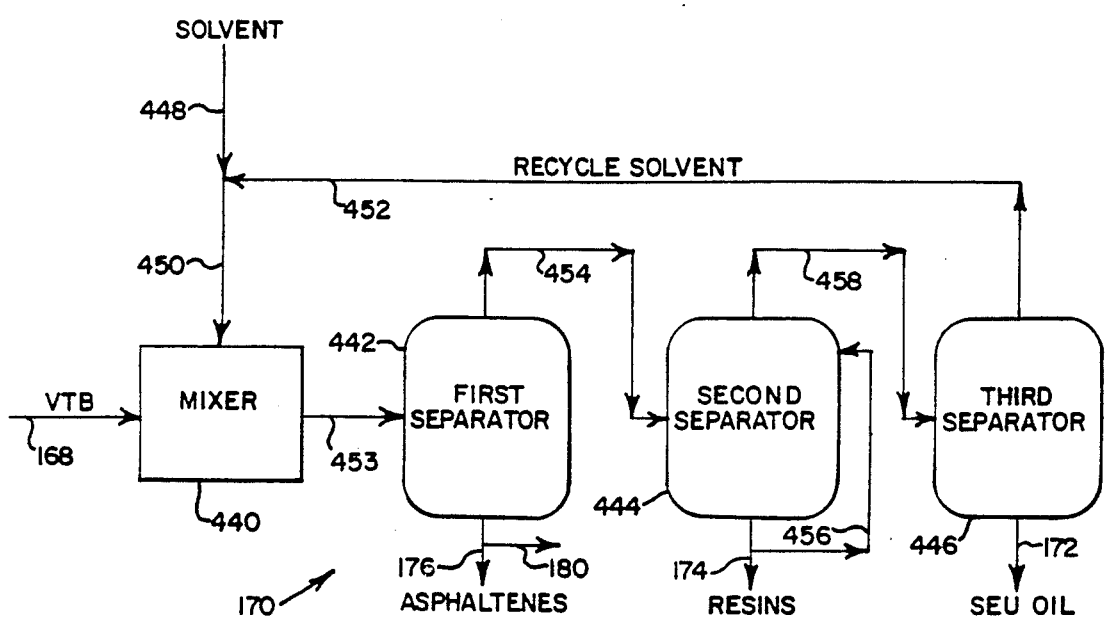
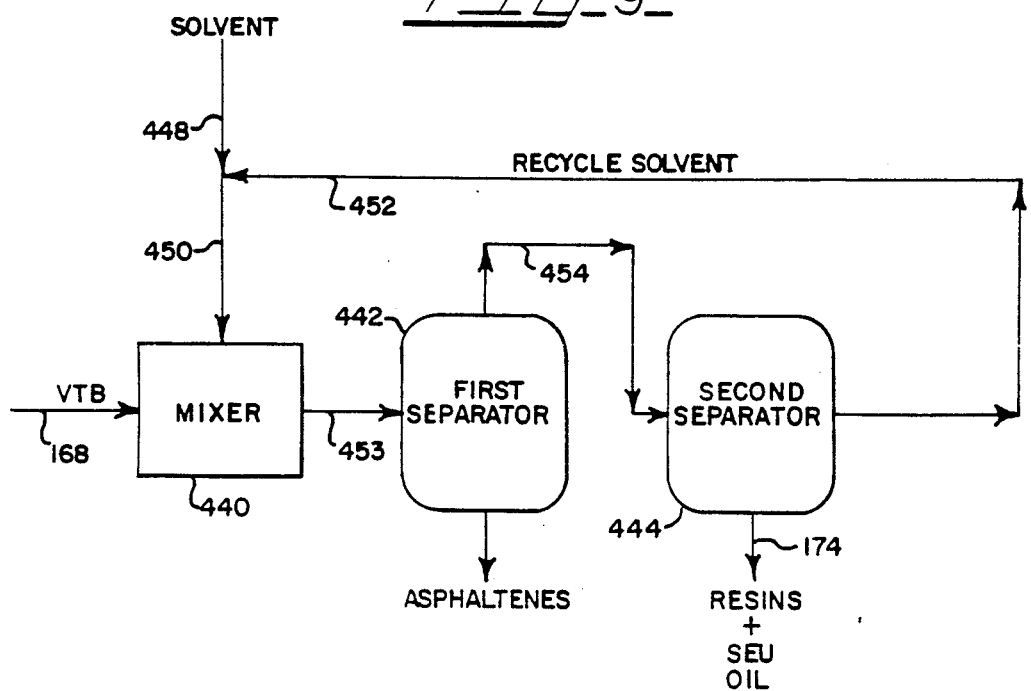

RESID HYDROTREATING WITH RESINS

BACKGROUND OF THE INVENTION

This invention relates to resid hydrotreating and, more particularly, to a process for increasing the yield in a resid hydrotreating unit.

In the past, spiraling oil costs and extensive price fluctuations have created instability and uncertainty for net oil consuming countries, such as the United States, to attain adequate supplies of high-quality, low-sulfur, petroleum crude oil (sweet crude) from Nigeria, Norway, and other countries at reasonable prices for conversion into gasoline, fuel oil, and petrochemical feedstocks. In an effort to stabilize the supply and availability of crude oil at reasonable prices, Amoco Oil Company has developed, constructed, and commercialized extensive, multimillion dollar refinery projects under the Second Crude Replacement Program (CRP II) to process poorer quality, high-sulfur, petroleum crude oil (sour crude) and demetalate, desulfurize, and hydrocrack resid to produce highvalue products, such as gasoline, distillates, catalytic cracker feed, metallurgical coke, and petrochemical feedstocks. The Crude Replacement Program is of great benefit to the oil-consuming nations by providing for the availability of adequate supplies of gasoline and other petroleum products at reasonable prices while protecting the downstream operations of refining companies.

During resid hydrotreating, such as under Amoco Oil Company's Crude Replacement Program, resid oil is upgraded with hydrogen and a hydrotreating catalyst to produce more valuable lower-boiling liquid products. Undesirably, carbonaceous solids are formed, however, during resid hydrotreating. These solids have been characterized as multicondensed aromatics which form and precipitate from cracking of the side chains of asphaltenes. The solids are substantially insoluble in hexane, pentane, and in the effluent hydrotreated product oil. The solids become entrained and are carried away with the product. Such solids tend to stick together, adhere to the sides of vessels, grow bigger, and agglomerate. Such solids are more polar and less soluble than the residual oil feedstock.

Carbonaceous solids are produced as a reaction by-product during ebullated bed hydrotreating (expanded bed hydrotreating). During ebullated bed hydrotreating, the ebullating hydrotreating catalyst fines serve as a nucleus and center for asphaltene growth. The situation becomes even more aggravated when two or more hydrotreating reactors are connected in series as in many commercial operations. In such cases, solids formed in the first reactor not only form nucleation sites for solids growth and agglomeration in the first reactor, but are carried over with the hydrotreated product oil into the second reactor, etc., for even larger solids growth and agglomeration.

The concentration of carbonaceous solids increases at more severe hydrotreating conditions, at higher temperatures and at higher resid conversion levels. The amount of carbonaceous solids is dependent on the type of feed. Resid conversion is limited by the formation of carbonaceous solids.

Solids formed during resid hydrotreating cause deposition and poor flow patterns in the reactors, as well as fouling, plugging, and blocking of conduits and downstream equipment. Oils laden with solids cannot be efficiently or readily pipelined. Hydrotreating solids can foul valves and other equipment, and can build up insulative layers on heat exchange surfaces reducing their efficiency. Buildup of hydrotreated solids can lead to equipment repair, shutdown, extended downtime, reduced process yield, decreased efficiency, and undesired coke formation.

Generally, organometallic compounds are substantially heavier than the oils and are associated with the asphaltenes in the heavy hydrocarbon materials. However, some of the organometallic compounds are associated with the resins and some of the heavier oils in the heavy hydrocarbon materials. The presence of organometallic compounds in the separated oils fraction is undesirable. The metals tend to poison catalysts employed in refining processes to upgrade the oils fraction into other useful products.

Catalytic cracking of oil is an important refinery process which is used to produce gasoline and other hydrocarbons. During catalytic cracking, the feedstock, which is generally a cut or fraction of crude oil, is cracked in a reactor under catalytic cracking temperatures and pressures in the presence of a catalyst to produce more valuable, lower molecular weight hydrocarbons. Gas oil is usually used as a feedstock in catalytic cracking. Gas oil feedstocks typically contain from 55% to 80% gas oil by volume having a boiling range from 650° F. to 1000° F. and less than 1% RAMS carbon by weight. Gas oil feedstocks also typically contain less than 5% by volume naphtha and lighter hydrocarbons having a boiling temperature below 430° F., from 10% to 30% by volume diesel and kerosene having a boiling range from 430° F. to 650° F., and less than 10% by volume resid having a boiling temperature above 1000° F. It is desirable to provide an effective process to increase the yield of gasoline (naphtha) in catalytic cracking units.

It has been known to deasphalt and catalytically crack virgin unhydrotreated, low sulfur resid, as well as to deasphalt, subsequently hydrotreat, and catalytically crack virgin high sulfur resid. Better rates and extent of resid conversion are desirable, however. Furthermore, such prior art processes produce hydrogen-rich asphaltenes that are difficult and expensive to handle and process, melt (liquify) at relatively low temperatures and cannot be used as solid fuel, are difficult to blend into fuel oils and paving asphalt, and are not generally useable in other products.

Over the years, a variety of processes and equipment have been suggested for various refining operations, such as for upgrading oil, hydrotreating, reducing hydrotreated solids, and catalytic cracking. Typifying some of these prior art processes and equipment are those described in U.S. Pat. Nos.: 2,382,382; 2,398,739; 2,398,759; 2,414,002; 2,425,849; 2,436,927; 2,884,303; 2,981,676; 2,985,584; 3,004,926; 3,039,953; 3,168,459; 3,338,818; 3,351,548; 3,364,136; 3,513,087; 3,563,911; 3,661,800; 3,766,055; 3,838,036; 3,844,973; 3,905,892; 3,909,392; 3,923,636; 4,191,636; 4,239,616; 4,290,880; 4,305,814; 4,331,533; 4,332,674; 4,341,623; 4,341,660; 4,400,264; 4,454,023; 4,486,295; 4,478,705; 4,495,060; 4,502,944; 4,521,295; 4,526,676; 4,592,827; 4,606,809; 4,617,175; 4,618,412; 4,622,210; 4,640,762; 4,655,903; 4,661,265; 4,662,669; 4,692,318; 4,695,370; 4,673,485; 4,681,674; 4,686,028; 4,720,337; 4,743,356; 4,753,721; 4,767,521; 4,769,127; 4,773,986; 4,808,289; and 4,818,371. These prior art processes and equipment have met with varying degrees of success.

It is, therefore, desirable to provide an improved hydrotreating process for increasing the yield of more valuable lower-boiling liquid products.

SUMMARY OF THE INVENTION

An improved hydrotreating process is provided in which vacuum reduced crude (resid oil) and resins, such as from a solvent extraction unit or other deasphalting unit (deasphalter), are hydrotreated and ebullated with hydrogen-rich gases in the presence of a hydrotreating catalyst to increase the yield of upgraded hydrotreated oil. The novel hydrotreating process is particularly useful in ebullated or expanded bed hydrotreaters. For best results, hydrotreating occurs at a pressure ranging from 2550 psia to 3050 psia without hydrogen donors. Advantageously, the novel hydrotreating process is efficient, effective, economical, improves resid conversion, and increases profitability.

The hydrotreated oil can be fractionated in a fractionator, such as in an atmospheric tower and/or vacuum tower, leaving resid bottoms. The resid bottoms are further separated into separate streams of resins, asphaltenes, and oil, in a deasphalting unit, preferably a multistage solvent extraction unit operated with supercritical solvent recovery. The deasphalted, solvent-extracted resins are recycled to the ebullated bed reactor of the resid hydrotreating unit as part of the feedstock. The asphaltenes can be transported for use as solid fuel. Some of the asphaltenes can also be fed to the coker and coked, or passed to a calciner for subsequent use as coke in a metal processing mill. The deasphalted, solvent-extracted oil can be cracked in a catalytic cracking unit to produce gasoline and other high value products.

Compared to the delayed coking and prior art processing of the hydrotreated resid oil, the improved hydrotreating process increases the conversion of resins and resid (resid oil) to more valuable lower-boiling liquid products, such as naphtha (gasoline) and distillates (diesel fuel, kerosene). Desirably, the resins readily hydrocrack in the resid hydrotreating unit and also provide a good diluent to prevent solids formation in the resid hydrotreating unit. Advantageously, the resins serve to inhibit the formation of carbonaceous solids and prevent them from precipitating. The low solids hydrotreated oil can be safely pipelined through valves, outlet orifices, pumps, heat exchangers, and downstream refining equipment. Hydrotreating with resins decreases the frequency of repair, reduces downtime, and enhances the useful life of refining equipment, as well as minimizes coke deposition and improves the flow patterns in the hydrotreating reactors.

Advantageously, the profit to investment ratio (PI) for the novel hydrotreating process is very high. Incentives come from increased light oil yields, relative to delayed coking, and from freeing up coking capacity.

The asphaltenes which have been hydrotreated and separated in a deasphalter, preferably a solvent extraction unit, in contrast to virgin asphaltenes, have relatively low sulphur, typically less than 3.5% by weight, and can be used directly as solid fuel.

The deasphalted oil or solvent-extracted oil achieves conversion and gasoline yields in a catalytic cracking unit that are comparable to those obtained with gas oils.

It was discovered, quite unexpectedly, that the deasphalted oil from vacuum residua reacts relatively slowly in the ebullated bed reactors of the resid hydrotreating unit compared to the resins and asphaltenes, and therefore the oils are concentrated in the vacuum bottoms product effluent from the resid hydrotreating unit. Further, while the virgin, unhydrotreated deasphalted oils are low in RAMS carbon (ramsbottom carbon), their high sulfur and metals content makes them undesirable feeds for catalytic cracking, but the hydrotreated deasphalted oils contain low concentrations of RAMS carbon, sulfur, and metals, and are especially useful as catalytic cracker feed. It is unexpected to be able to isolate a large fraction (about 40-60 wt %) of deasphalted oil from the vacuum bottoms effluent that has low RAMS carbon, in that hydrotreating generally causes the RAMS carbon in the vacuum bottoms to increase about 50% or more relative to the virgin unhydrotreated vacuum residua. Also, it was surprisingly found that the increase in RAMS carbon in the hydrotreated vacuum bottoms is due to a selective increase in the concentration of RAMS carbon in the asphaltene fraction, while the RAMS carbon content of the deasphalted oils and resins are relatively unchanged compared to virgin unhydrotreated resid. More than 95% by weight of the metals in the vacuum bottoms were removed from the deasphalted oil during solvent extraction. These peculiar findings make the deasphalting of hydrotreated vacuum bottoms a particularly attractive alternative to direct delayed coking in that the asphaltene fraction is so refractory and such low reactivity as to produce little oil yield that it is best used directly as a solid fuel. The deasphalted oil gives higher light oils yields upon catalytic cracking (compared to delayed coking). Furthermore, the hydrotreated resins fraction is comparable in reactivity to virgin resid and converts efficiently and effectively to lighter products upon recycle to the resid hydrotreating unit, while the entire vacuum tower bottoms are relatively unreactive. Moreover, it was also unexpectedly determined that recycling the resins to the resid hydrotreating unit reduced the formation of carbonaceous solids therein.

In some circumstances, it may be desirable to feed both deasphalted resins and deasphalted oil to the ebullated bed reactors of the resid hydrotreating unit or to the catalytic cracking unit.

As used in this patent application, the terms "deasphalting unit" and "deasphalter" mean one or more vessels or other equipment which are used to separate oil, resins, and asphaltenes.

The term "solvent extraction unit" as used in this patent application means a deasphalter in which resid is separated into oil, resins, and asphaltenes by means of one or more solvents.

The term "deasphalted oil" as used in this patent application means an oil that has been obtained from a deasphalting unit. Such oils are generally the lightest or least dense products produced in a deasphalting unit and comprise saturate aliphatic, alicyclic, and aromatic hydrogens. Deasphalted oil generally comprises less than 30% aromatic carbon and low levels of heteroatoms except sulphur. Deasphalted oil from vacuum resid can be generally characterized as follows: a Conradson or Ramsbottom carbon residue of 1 to less than 12 weight % and a hydrogen to carbon (H/C) atomic ratio of 1.5% to 2%. Deasphalted oil can contain 50 ppm or less, preferably less than 5 ppm, and most preferably less than 2 ppm, of vanadium and 50 ppm or less, preferably less than 5 ppm, and most preferably less than 2 ppm of nickel. The sulfur and nitrogen concentrations of deasphalted oil can be 90% or less of the sulfur and nitrogen concentrations of the resid feed oil to the deasphalter.

The term "solvent-extracted oil" as used in this patent application means substantially deasphalted, deresined (resin-free) oil which has been separated and obtained from a solvent extraction unit.

The term "asphaltenes" as used in this patent application means asphaltenes which have been separated and obtained from a deasphalting unit. Asphaltenes comprise a heavy polar fraction. Asphaltenes are typically the residue which remains after the resins and oils have been separated from resid in a deasphalting unit. Asphaltenes from vacuum resid are generally characterized as follows: a Conradson or Ramsbottom carbon residue of 30 to 90 weight % and a hydrogen to carbon (H/C) atomic ratio of 0.5% to less than 1.2%. Asphaltenes can contain from 50 ppm to 5000 ppm vanadium and from 20 ppm to 2000 ppm nickel. The sulfur concentration of asphaltenes can be from 110% to 250% greater than the concentration of sulfur in the resid feed oil to the deasphalter. The nitrogen concentration of asphaltenes can be from 110% to 350% greater than the concentration of nitrogen in the resid feed oil to the deasphalter.

The term "resins" as used in this patent application means resins that have been separated and obtained from a deasphalting unit. Resins are denser or heavier than deasphalted oil and comprise more aromatic hydrocarbons with highly aliphatic substituted side chains. Resins also comprise metals, such as nickel and vanadium, and comprise more heteroatoms than deasphalted oil. Resins from vacuum resid can be generally characterized as follows: a Conradson or Ramsbottom carbon residue of 10 to less than 30 weight % and a hydrogen to carbon (H/C) atomic ratio of 1.2% to less than 1.5%. Resins can contain 1000 ppm or less of vanadium and 300 ppm or less of nickel. The sulfur concentration in resins can be from 50% to 200% of the concentration of sulfur in the resid oil feed to the deasphalter. The nitrogen concentration in resins can be from 30% to 250% of the concentration of nitrogen in the resid oil feed in the deasphalter.

The terms "resid oil" and "resid" as used in this patent application mean residual oil.

The term "supercritical conditions" as used in this patent application mean a condition in a deasphalting unit where the solvent does not exist in both a vapor phase and a liquid phase. Under such circumstances, the solvent is generally in a gaseous or vapor phase.

The term "low sulfur" resid as used in this patent application means a resid comprising less than 2% by weight sulfur. Resid containing sulfur, other than low sulfur resid, is sometimes characterized as high sulfur resid.

A more detailed explanation is provided in the following description and appended claims taken in conjunction with the accompanying drawings.

BRIEF DESCRIPTION OF THE DRAWINGS

FIG. 4 is a cross-sectional view of an ebullated bed reactor;

FIG. 5 is a perspective view of resid hydrotreating units and associated refinery equipment;

FIG. 6 is a schematic flow diagram of a catalytic cracking unit;

FIG. 7 is a schematic flow diagram of a coker unit;

FIG. 8 is a schematic flow diagram of a three-stage solvent extraction unit; and FIG. 9 is a schematic flow diagram of a two-stage solvent extraction unit.

DETAILED DESCRIPTION OF THE PREFERRED EMBODIMENT

Figure 2:
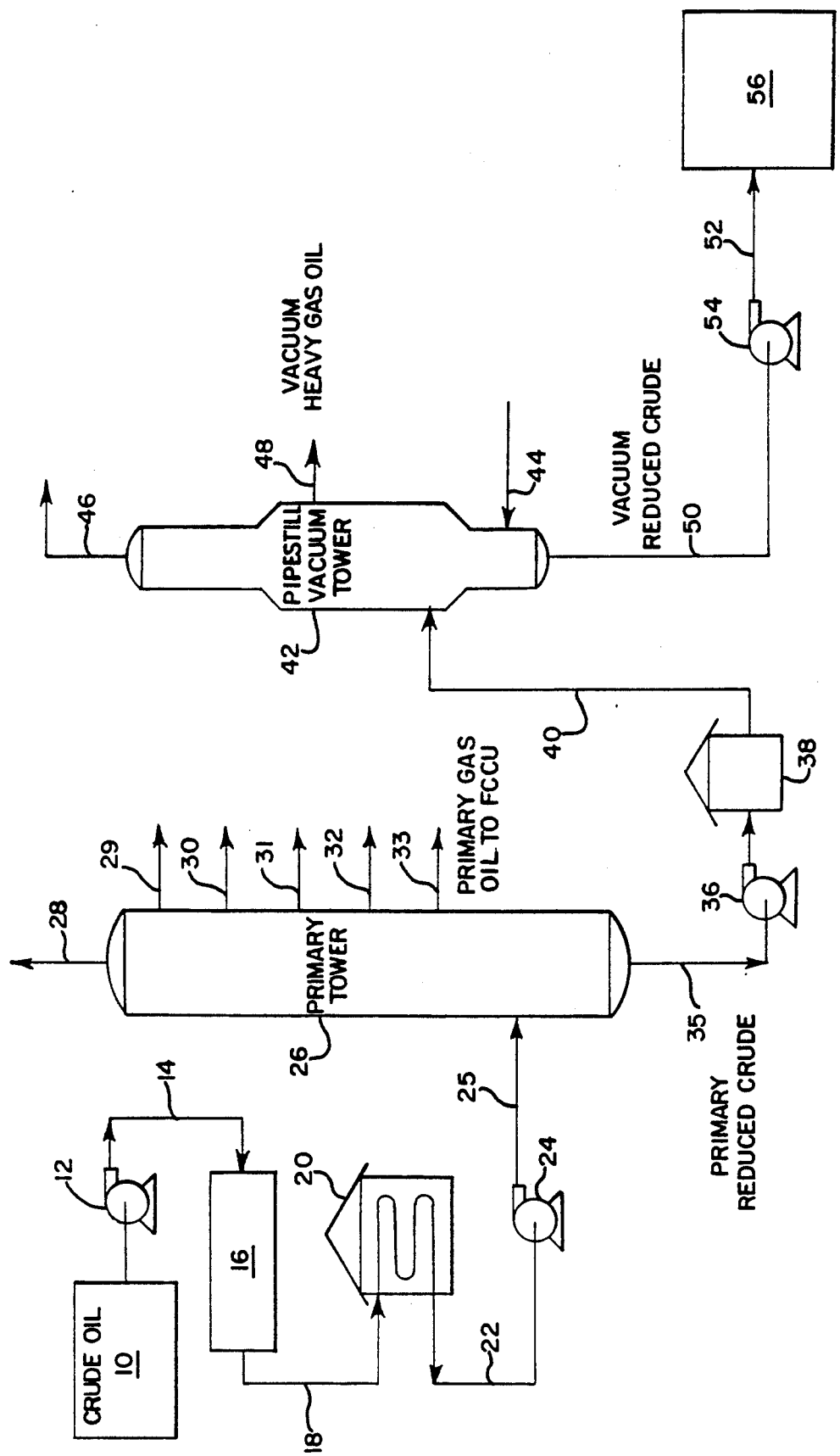
FIG. 2 is a schematic flow diagram for partially refining crude oil.

In refining (FIG. 2), unrefined, raw, whole crude oil (petroleum) is withdrawn from an aboveground storage tank 10 at about 75° F. to about 80° F. by a pump 12 and pumped through feed line 14 into one or more desalters 16 to remove particulates, such as sand, salt, and metals, from the oil. The desalted oil is fed through furnace inlet line 18 into a pipestill furnace 20 where it is heated to a temperature, such as to 750° F. at a pressure ranging from 125 to 200 psi. The heated oil is removed from the furnace through exit line 22 by a pump 24 and pumped through a feed line 25 to a primary distillation tower 26.

The heated oil enters the flash zone of the primary atmospheric distillation tower, pipestill, or crude oil unit 26 before proceeding to its upper rectifier section or the lower stripper section. The primary tower is preferably operated at a pressure less than 60 psi. In the primary tower, the heated oil is separated into fractions of wet gas, light naphtha, intermediate naphtha, heavy naphtha, kerosene, virgin gas oil, and primary reduced crude. A portion of the wet gas, naphtha, and kerosene is preferably refluxed (recycled) back to the primary tower to enhance fractionation efficiency.

Figure 1:
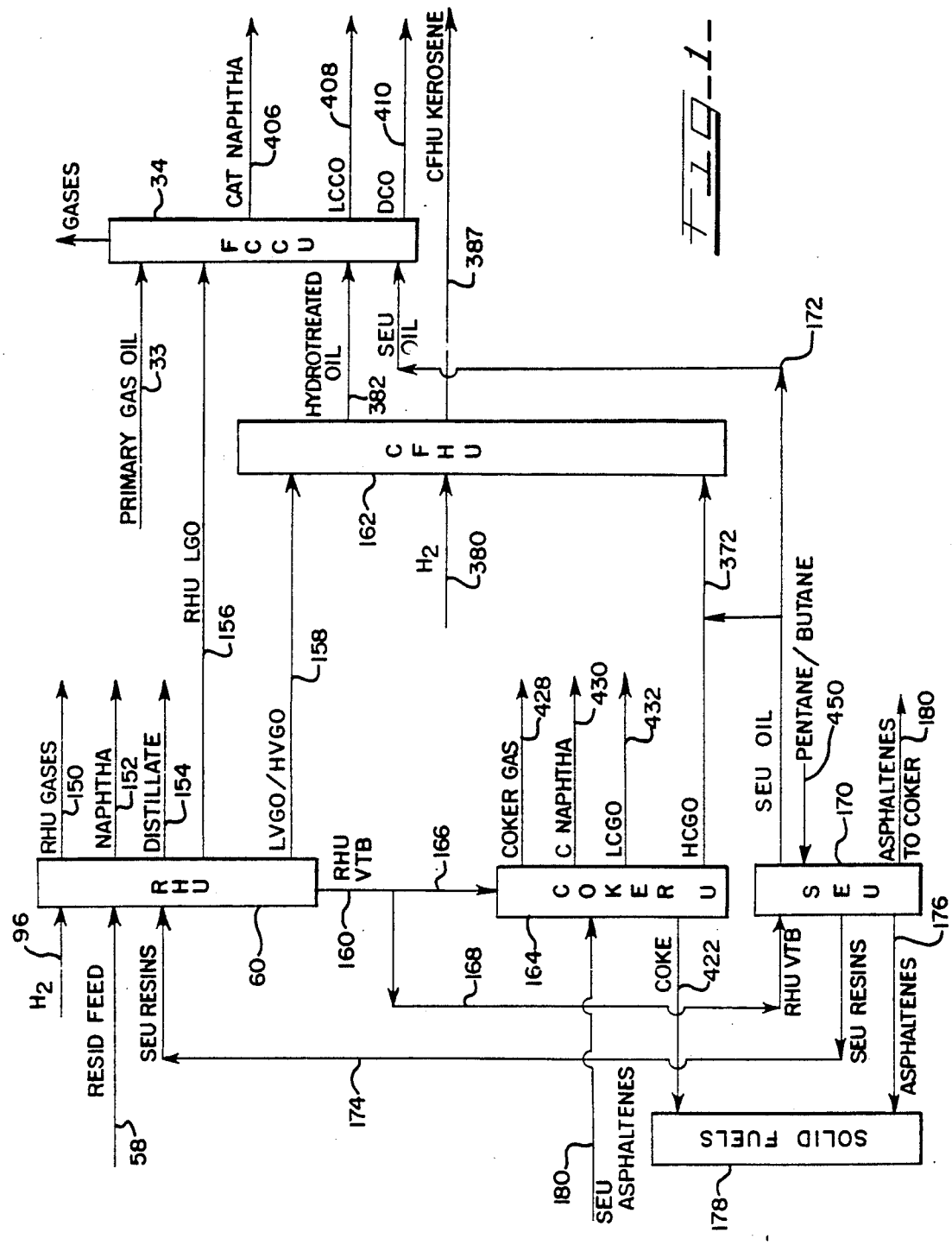
FIG. 1 is a schematic flow diagram of a refinery in accordance with principles of the present invention.

Wet gas is withdrawn from the primary tower 26 through overhead wet gas line 28. Light naphtha is removed from the primary tower through light naphtha line 29. Intermediate naphtha is removed from the primary tower through intermediate naphtha line 30. Heavy naphtha is withdrawn from the primary tower 26 through heavy naphtha line 31. Kerosene and oil for producing jet fuel and furnace oil are removed from the primary tower through kerosene line 32. Primary virgin, atmospheric gas oil is removed from the primary tower through primary gas oil line 33 and pumped to the fluid catalytic cracking unit (FCCU) 34 (FIG. 1).

Primary reduced crude is discharged from the bottom of the primary tower 26 (FIG. 2) through the primary reduced crude line 35. The primary reduced crude in line 35 is pumped by pump 36 into a furnace 38 where it is heated, such as to a temperature from about 520° F. to about 750° F. The heated primary reduced crude is conveyed through a furnace discharge line 40 into the flash zone of a pipestill vacuum tower 42.

The pipestill vacuum tower 42 is preferably operated at a pressure ranging from 35 to 50 mm of mercury. Steam is injected into the bottom portion of the vacuum tower through steam line 44. In the vacuum tower, wet gas is withdrawn from the top of the tower through overhead wet gas line 46. Heavy and/or light vacuum gas oil are removed from the middle portion of the vacuum tower through heavy gas oil line 48. Vacuum-reduced crude is removed from the bottom of the vacuum tower through vacuum-reduced crude line 50. The vacuum-reduced crude typically has an initial boiling point near about 1000° F.

Figure 3:
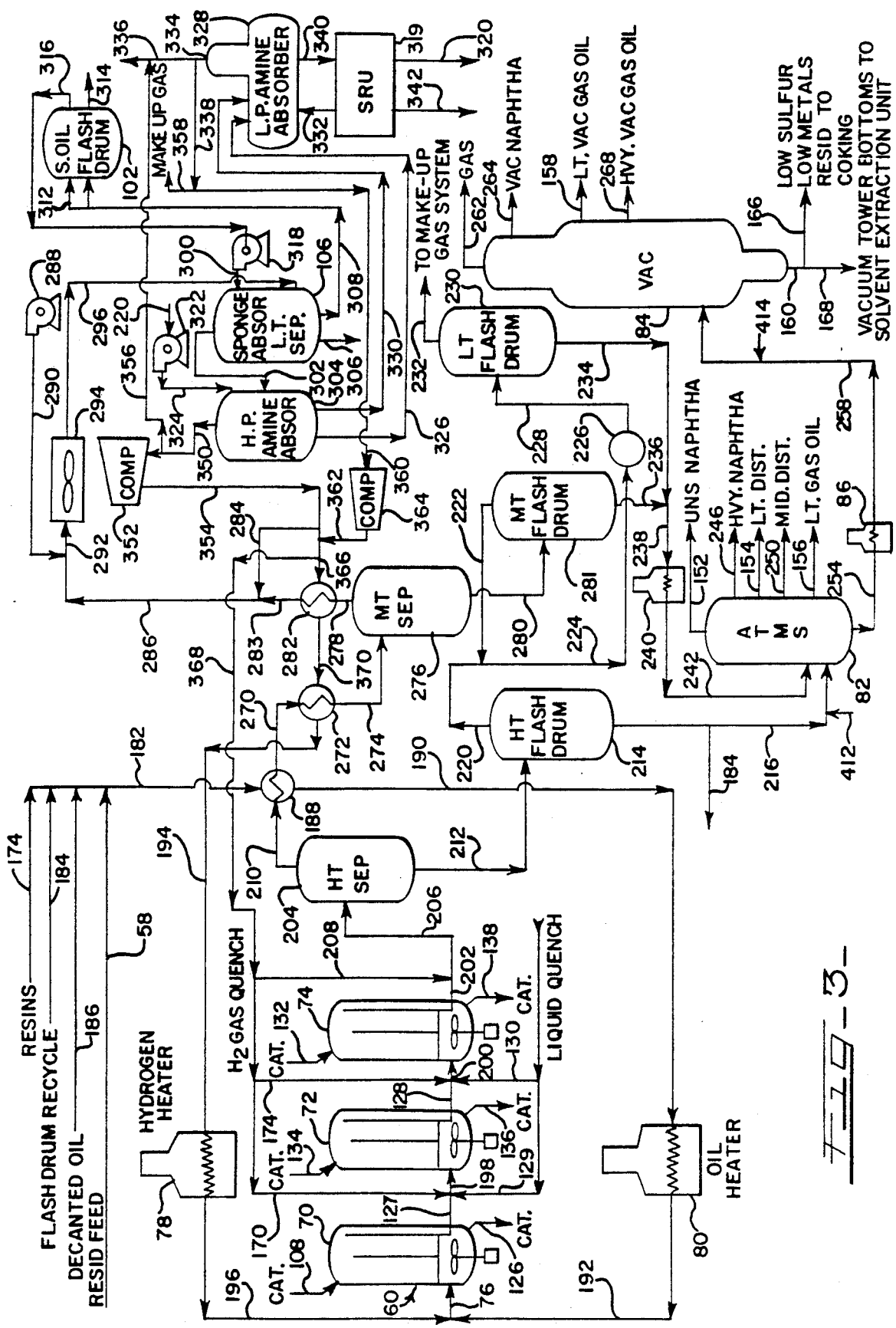
FIG. 3 is a schematic flow diagram of a resid hydrotreating unit.

The vacuum-reduced crude, also referred to as resid, resid oil, and virgin unhydrotreated resid, is pumped through vacuum-reduced crude lines 50 and 52 by a pump 54 into a feed drum or surge drum 56. Resid oil is pumped from the surge drum through resid feed line 58 (FIG. 1) into a resid hydrotreating unit complex 60 (RHU) comprising three resid hydrotreating units and associated refining equipment as shown in FIG. 3.

As shown in FIG. 5, each resid hydrotreating unit 64, 66, and 68 is a reactor train comprising a cascaded series or set of three ebullated bed reactors 70, 72, and 74. Hydrogen is injected into the ebullated bed reactors through feed line 76. A relatively high sulfur resid or sour crude is fed to the reactor where it is hydroprocessed (hydrotreated) in the presence of ebullated (expanded) fresh and/or equilibrium hydrotreating catalyst and hydrogen to produce an upgraded effluent product stream with reactor tail gases (effluent off gases) leaving used spent catalyst. As used throughout this patent application, the term "equilibrium hydrotreating catalyst" means a fresh hydrotreating catalyst which has been partially or fully used. The term "spent hydrotreating catalyst" as used in this patent application comprises equilibrium hydrotreating catalyst which has been withdrawn from a hydrotreating reactor. Hydroprocessing in the RHU includes demetallation, desulfurization, denitrogenation, resid conversion, oxygen removal (deoxygenation), hydrocracking, removal of Rams carbon, and the saturation of olefinic and aromatic hydrocarbons.

The resid hydrotreating units and associated refining equipment of FIG. 5 comprise three identical parallel trains of cascaded ebullated bed reactors 70, 72, and 74, as well as hydrogen heaters 78, influent oil heaters 80, an atmospheric tower 82, a vacuum tower 84, a vacuum tower oil heater 86, a hydrogen compression area 88, oil preheater exchangers 90, separators 92, recycled gas compressors 94, flash drums 96, separators 98, raw oil surge drums 100, sponge oil flash drums 102, amine absorbers and recycle gas suction drums 104, and sponge oil absorbers and separators 106.

Each of the reactor trains comprises three ebullated bed reactors in series. The oil feed typically comprises resid oil (resid) and heavy gas oil. The feed gas comprises upgraded recycle gases and fresh makeup gases. Demetallation primarily occurs in the first ebullated bed reactor in each train. Desulfurization occurs throughout the ebullated bed reactors in each train. The effluent product stream typically comprises light hydrocarbon gases, hydrotreated naphtha, distillates, light and heavy gas oil, and unconverted hydrotreated resid. The hydrotreating catalyst typically comprises a metal hydrogenating component dispersed on a porous refractory, inorganic oxide support.

The resid hydrotreating unit is quite flexible and, if desired, the same catalyst can be fed to one or more of the reactors or a separate demetallation catalyst can be fed to the first reactor while a different catalyst can be fed to the second and/or third reactors. Alternatively, different catalysts can be fed to each of the reactors, if desired. The used spent catalyst typically contains nickel, sulfur, vanadium, and carbon (coke). Many tons of catalyst are transported into, out of, and replaced in the ebullated bed reactors daily.

As shown in FIG. 4, fresh hydrotreating catalyst is fed downwardly into the top of the first ebullated bed reactor 70 through the fresh catalyst feed line 108. Hydrogen-rich gases and feed comprising resid, resins, flash drum recycle, and decanted oil, enter the bottom of the first ebullated bed reactor 70 through feed line 76 and flows upwardly through a distributor plate 110 into the fresh catalyst bed 112. The distributor plate contains numerous bubble caps 114 and risers 116 which help distribute the oil and the gas across the reactor. An ebullated pump 118 circulates oil from a recycle pan 120 through a downcomer 122 and the distributor plate 110. The rate is sufficient to lift and expand the catalyst bed from its initial settled level to its steady state expanded level. The effluent product stream of partially hydrotreated oil and hydrogen-rich gases are withdrawn from the top of the reactor through effluent product line 124. The used spent catalyst is withdrawn from the bottom of the reactor through spent catalyst discharge line 126. The spent catalyst typically contains deposits of metals, such as nickel and vanadium, which have been removed from the influent feed oil (resid) during hydrotreating.

Catalyst particles are suspended in a three-phase mixture of catalyst, oil, and hydrogen-rich feed gas in the reaction zone of the reactor. Hydrogen-rich feed gas typically continually bubbles through the oil. The random ebullating motion of the catalyst particles results in a turbulent mixture of the phases which promotes good contact mixing and minimizes temperature gradients.

The cascading of the ebullated bed reactors in a series of three per reactor train, in which the effluent of one reactor serves as the feed to the next reactor, greatly improves the catalytic performance of the backmixed ebullated bed process. Increasing the catalyst replacement rate increases the average catalyst activity.

As shown in FIG. 3, the partially hydrotreated effluent in the outlet line 127 of the first ebullated bed reactor 70 comprises the influent feed of the second ebullated bed reactor 72. The partially hydrotreated effluent in the outlet line 128 of the second ebullated bed reactor 72 is the influent feed of the third ebullated bed reactor 74. The second and third reactors are functionally, operatively, and structurally similar to the first reactor and cooperate with the first reactor to effectively hydrotreat and upgrade the influent feed oil. Quench liquid (oil) and/or vapor can be injected into the influent feeds of the second and third reactors through quench lines 129 and 130 to cool and control the bulk temperatures in the second and third reactors. Fresh catalyst can be fed into the top of all the reactors, although for process efficiency and economy it is preferred to utilize catalyst staging by feeding fresh catalyst into the first and third reactors through fresh catalyst feed lines 108 and 132 and by feeding recycled spent catalyst from the third reactor into the second reactor through recycle catalyst line 134. Used spent catalyst is discharged from the reactors through spent catalyst discharge lines 126, 136, and 138. Preferably, resid is heated in the oil heater 80 and hydrogen-rich gases are heated in the hydrogen heater 78 before being combined and fed through the feed line 76 into the first reactor for process efficiency. The effluent product streams can be withdrawn from the bottoms or tops of the reactors, as desired.

The fluid state of the ebullated hydrotreating catalyst enhances the flexibility of the ebullated bed reactors and permits the addition or withdrawal of oil/catalyst slurry without taking the reactors offstream. Daily catalyst replacement results in a steady state equilibrium catalyst activity.

Products are withdrawn from the third reactor 74 and are separated into fractions of oil and gas in the towers and other processing equipment as described hereinafter.

The ebullated bed reactors are capable of handling atmospheric and vacuum resids from a wide range of sour and/or heavy crudes. Such crudes can have a gravity as low as 1° API, a sulfur content up to 8% by weight, and substantial amounts of nickel and vanadium. The ebullated bed reactors typically operate at a temperature above 700° F. and at a hydrogen partial pressure greater than 1500 psi.

Ebullated bed reactors have many advantages over fixed bed reactors. They permit operation at higher average temperatures and allow high heat release. They permit the addition and withdrawal of catalyst without necessitating shutdown. They avoid plugging due to dirty feed and formation of solids during resid conversion.

Since the liquid resid feed does not usually have enough velocity to expand the catalyst bed above its settled level, liquid is recycled from the top of the reactor to the bottom of the reactor through a downcomer pipe and then pumped back up through the reactor at a sufficient velocity to attain the required degree of expansion.

As shown in FIG. 1, the products produced from the resid hydrotreating units in the ebullated bed reactors include: light hydrocarbon gases (RHU gases) in gas line 150; naphtha comprising light naphtha, intermediate naphtha, heavy naphtha and vacuum naphtha in one or more naphtha lines 152; distillate comprising light distillate and mid-distillate in one or more distillate lines 154; light gas oil in gas oil line 156; light vacuum gas oil and heavy vacuum gas oil in one or more vacuum gas oil lines 158; and hydrotreated vacuum resid comprising vacuum tower bottoms in a vacuum resid line 160. Light and intermediate naphthas can be sent to a vapor recovery unit for use as gasoline blending stocks and reformer feed. Heavy naphtha can be sent to the reformer to produce gasoline. The mid-distillate oil is useful for producing diesel fuel and furnace oil, as well as for conveying and/or cooling the spent catalyst. Resid hydrotreated (RHU) light gas oil is useful as feedstock for the catalytic cracking unit 34. Light and heavy vacuum gas oils can be upgraded in a catalytic feed hydrotreating unit 162 (FHU). Some of the vacuum resid comprising resid hydrotreating unit vacuum tower bottoms (RHU VTB) can be sent to the coker unit 164 via coker inlet line 166 to produce coke. A substantial portion of the vacuum resid (RHU VTB) can be fed through a feeder line or inlet line 168 to a deasphalter or deasphalting unit 170 where the vacuum resid is separated into deasphalted oil, deasphalted resins, and asphaltenes.

In the preferred embodiment, the deasphalter 170 (FIG. 1) comprises a solvent extraction unit (SEU) operated with supercritical solvent recovery. Deasphalted solvent-extracted oil (SEU oil) in SEU oil line 172 is useful as a feedstock to the catalytic cracking unit 34 to increase the yield of gasoline and other hydrocarbon liquids. Deasphalted solvent-extracted resins (SEU resins) in SEU resin line 174 are useful as part of the feed to the resid hydrotreating unit (RHU) 60 to increase the yield of more valuable lower-boiling liquid hydrocarbons. A portion of the asphaltenes can be conveyed or passed through an asphaltene line or chute 176 or otherwise transported to a solid fuels mixing and storage facility 178, such as tank, bin or furnace, for use as solid fuel. Another portion of the solvent-extracted asphaltenes (SEU asphaltenes) can be conveyed or passed through a SEU asphaltene line or chute 180 to the coker 164.

As shown in FIG. 3, a relatively high sulfur resid oil feed, which can contain heavy gas oil, is conveyed by a resid feed line 58 to a combined feed line 182. Solvent-extracted resins in resin line 174 are also fed to combined feed line. Flash drum recycle oil in flash drum recycle line 184 and decanted oil (DCO) in decanted oil line 186 can also be fed and mixed in combined feed line 182. The feed in combined feed line 182 comprising resid, SEU resins, decanted oil, and flash drum recycle oil is conveyed to a heat exchanger 188 where the feed is preheated. The feed is conveyed through a preheated feed line 190 to an oil heater 80 where it is heated to a temperature ranging from about 650° F. to 750° F. The heated feed (feedstock) is passed through a heated influent feed line 192 to an oil gas feed line 76.

Hydrogen-containing feed gas in the feed gas line 194 is fed into a hydrogen heater or feed gas heater 78 where it is heated to a temperature ranging from about 650° F. to about 900° F. The feed gas is a mixture of upgraded, methane-lean tail gases (effluent off gases) and hydrogen-rich, fresh makeup gases comprising at least about 95% by volume hydrogen and preferably at least about 96% by volume hydrogen. The feed gas comprises a substantial amount of hydrogen, a lesser amount of methane, and small amounts of ethane. The heated feed gas is conveyed through the heated feed gas line 196 to the gas oil feed line 76 where it is conveyed along with the heated resid oil to the first ebullated bed reactor 70.

Fresh hydrotreating catalyst is fed into the first ebullated bed reactor 70 through the fresh catalyst line 108. Spent catalyst is withdrawn from the first reactor through the spent catalyst line 126. In the first reactor, the resid oil is hydroprocessed (hydrotreated), ebullated, contacted, and mixed with the hydrogen-rich feed gas in the presence of the hydrotreating catalyst at a temperature of about 700° F. to about 850° F., at a pressure of about 2650 psia to about 3050 psia, and at a hydrogen partial pressure of about 1800 psia to about 2300 psia to produce a hydrotreated (hydroprocessed), upgraded, effluent product stream. The product stream is discharged from the first reactor through the first reactor discharge line 127 and conveyed through the second reactor feed line 198 into the second ebullated bed reactor 72. A liquid quench can be injected into the product feed entering the second reactor through a liquid quench line 129. The liquid quench can be sponge oil. A gas quench can be injected into the product feed before it enters the second reactor through a gas quench line 170. The gas quench preferably comprises a mixture of upgraded, methane-lean tail gases (effluent off gases) and fresh makeup gases.

Hydrotreating catalyst, which may be removed from the third reactor, is fed into the second reactor 72 through an influent catalyst line 134. Used spent catalyst is withdrawn from the second reactor through the second spent catalyst line 136. In the second reactor, the effluent resid oil product is hydroprocessed, hydrotreated, ebullated, contacted, and mixed with the hydrogen-rich feed gas and quench gas in the presence of the hydrotreating catalyst at a temperature of about 700° F. to about 850° F., at a pressure from about 2600 psia to about 3000 psia and at a hydrogen partial pressure of about 1700 psia to about 2100 psia to produce an upgraded effluent product stream. The product stream is discharged from the second reactor through a second reactor discharge line 128.

The product feed is then fed into the third ebullated bed reactor 74 through a third reactor feed line 200. A liquid quench can be injected into the third reactor feed through an inlet liquid quench line 130. The liquid quench can be sponge oil. A gas quench can be injected into the third reactor feed through an input gas quench line 174. The gas quench can comprise upgraded, methanelean tail gases and fresh makeup gases. Fresh hydrotreating catalyst is fed into the third reactor through a fresh catalyst line 132. Used spent catalyst is withdrawn from the third reactor through the third reactor spent catalyst line 138. In the third reactor, the resid feed is hydroprocessed, hydrotreated, ebullated, contacted, and mixed with the hydrogen-rich gas in the presence of the hydrotreating catalyst at a temperature from about 700° F. to about 850° F., at a pressure of about 2550 psia to about 2950 psia and at a hydrogen partial pressure from about 1600 psia to about 2000 psia to produce an upgraded product stream. The product stream is withdrawn from the third reactor through the third reactor discharge line 202 and fed into a high-temperature, high-pressure separator 204 via inlet line 206. A gas quench can be injected into the product stream in the inlet line through a gas quench line 208 before the product stream enters the high-temperature separator. The gas quench can comprise upgraded, methane-lean tail gases and fresh makeup gases.

The upgraded effluent product streams discharged from the reactors comprise hydrotreated resid oil and reactor tail gases (effluent off gases). The tail gases comprise hydrogen, hydrogen sulfide, ammonia, water, methane, and other light hydrocarbon gases, such as ethane, propane, butane, and pentane.

In the high-temperature (HT) separator 204, the hydrotreated product stream is separated into a bottom stream of high-temperature, hydrotreated, heavy oil liquid and an overhead stream of gases and hydrotreated oil vapors. The high-temperature separator 204 is operated at a temperature of about 700° F. to about 850° F. and at a pressure from about 2500 psia to about 2900 psia. The overhead stream of gases and oil vapors is withdrawn from the high-temperature separator through an overhead line 210. The bottom stream of high-temperature heavy oil liquid is discharged from the bottom of the high-temperature separator through a high-temperature separator bottom line 212 and fed to a high-temperature flash drum 214.

In the high-temperature flash drum 214, the influent stream of heavy oil liquid is separated and flashed into a stream of high-temperature vapors and gases and an effluent stream of high-temperature, heavy oil liquid. The flash drum effluent, high-temperature, hydrotreated, heavy resid oil liquid (flash drum effluent) is discharged from the bottom of the flash drum 214 through the high-temperature flash drum bottom line 216. Part or all of the flash drum effluent in line 216 is fed into an atmospheric tower 82. Preferably, part of the flash drum effluent comprises flash drum recycle which is recycled to the first ebullated bed reactor 70 through flash drum recycle line 184 as part of the oil feed. The high-temperature flash gas and vapors are withdrawn from the high-temperature flash drum 214 through a high-temperature flash drum overhead line 220 and are conveyed, blended, and intermixed with medium-temperature overhead flash vapors from the medium-temperature (MT) flash drum overhead line 222 through a combined, common flash line 224. The combined flash gas and vapors are optionally cooled in one or more heat exchangers or coolers 226 before being conveyed through a line 228 to the low temperature (LT) flash drum 230.

In the LT flash drum 230, the influent high-temperature flash gases and vapors are separated into low-pressure gases and light oil liquid. The low-pressure gases are withdrawn from the LT flash drum through an outlet gas line 232 and conveyed downstream to the makeup gas system for use as sweet fuel. The light oil liquid is discharged from the LT flash drum through a light oil line 234 and is conveyed, blended, and intermixed with medium-temperature, light oil liquid from the medium-temperature, flash drum light oil line 236 in a combined, common light oil line 238. The combined medium-temperature, light oil liquid is heated in a furnace 240 and conveyed through a light oil feed line 242 to the atmospheric tower 82.

In the atmospheric tower 82, the hydrotreated, high-temperature, heavy oil liquid from the high-temperature flash drum effluent oil line 216 and the hydrotreated, medium-temperature, light oil liquid from the medium-temperature oil line 242 can be separated into fractions of light and intermediate naphtha, heavy naphtha, light distillate, mid-distillate, light atmospheric gas oil, and atmospheric hydrotreated resid oil. Light and intermediate naphtha can be withdrawn from the atmospheric tower through an unstable naphtha line 152. Heavy naphtha can be withdrawn from the atmospheric tower through a heavy naphtha line 246. Light distillate can be withdrawn from the atmospheric tower through a light distillate line 154. Mid-distillates can be withdrawn from the atmospheric tower through a mid-distillate line 250. Light virgin atmospheric gas oil can be withdrawn from the atmospheric tower through a light atmospheric gas oil line 156. Atmospheric resid oil is discharged from the bottom portion of the atmospheric tower through the atmospheric resid line 254 and heated in an atmospheric resid oil heater 86 before being conveyed through a vacuum tower feed line 258 to the vacuum tower 84.

In vacuum tower 84, the atmospheric influent, hydrotreated resid oil can be separated into gases, vacuum naphtha, light vacuum gas oil, heavy vacuum gas oil, and hydrotreated, vacuum resid oil or vacuum resid. The gases are withdrawn from the vacuum tower through an overhead vacuum gas line 262. Vacuum naphtha can be withdrawn from the vacuum tower through a vacuum naphtha line 264. Light vacuum gas oil (LVGO) can be withdrawn from the vacuum tower through a light vacuum gas oil line 158. Heavy vacuum gas oil (HVGO) can be withdrawn from the vacuum tower through a heavy vacuum gas oil line 268. Vacuum resid oil (vacuum resid) is withdrawn from the bottom of the vacuum tower 84 through a RHU vacuum tower bottoms line 160. Some of the vacuum resid is fed to a coker via a vacuum resid discharge line 166. The rest of the vacuum resid is conveyed to the solvent extract unit via a vacuum resid line 168.

Referring again to the high-temperature separator 204 (FIG. 3), high-temperature gases and oil vapors are withdrawn from the high-temperature separator 204 through an overhead vapor line 210 and cooled in a resid feed heat exchanger 188 which concurrently preheats the oil and resin feed in combined line 182 before the oil and resin feed enters the oil heater 80. The cooled vapors and gases exit the heat exchanger 188 and are passed through an intermediate line 270 and cooled in a high-temperature gas quench heat exchanger 272 which concurrently preheats the feed gas before the feed gas passes through the hydrogen heater inlet line 194 into the hydrogen heater 78. The cooled gases and vapors exit the heat exchanger 272 and are passed through a medium-temperature inlet line 274 to a medium-temperature, high-pressure separator 276.

In the medium-temperature (MT) separator 276, the influent gases and oil vapors are separated at a temperature of about 500° F. and at a pressure of about 2450 psia to about 2850 psia into medium-temperature gases and hydrotreated, medium-temperature liquid. The medium-temperature gases are withdrawn from the MT separator through a medium-temperature gas line 278. The medium-temperature liquid is discharged from the bottom of the MT separator through a medium-temperature liquid line 280 and conveyed to a medium-temperature flash drum 281.

In the medium-temperature (MT) flash drum 281, the influent medium-temperature liquid is separated and flashed into medium-temperature vapors and effluent medium-temperature, hydrotreated liquid. The medium-temperature flash vapors are withdrawn from the MT flash drum through a medium-temperature overhead line 222 and injected, blended, and mixed with the high-temperature overhead flash gases and vapors in the combined, common flash line 224 before being cooled in heat exchanger 226 and conveyed to the LT flash drum 230. The effluent medium-temperature liquid is discharged from the MT flash drum 281 through a light oil discharge line 236 and is injected, blended, and mixed with the low-temperature liquid from the LT flash drum in combined, common light oil liquid line 238 before being heated in the light oil heater 240 and conveyed to the atmospheric tower 82.

In the MT separator 276, the medium-temperature effluent gases exit the MT separator through an MT gas line 278 and are cooled in a medium-temperature (MT) feed gas heat exchanger 282 which also preheats the feed gas before the feed gas is subsequently heated in the HT heat exchanger 272 and the hydrogen heater 78. The cooled medium-temperature gases exit the MT heat exchanger 282 through a medium-temperature (MT) gas line 282 and are combined, blended and intermixed with compressed gas from an anti-surge line 284 in a combined, common gas line 286. The gas and vapors in gas line 286 are blended, diluted, and partially dissolved with wash water, pumped by the water pump 288 through a water line 290, in a combined water gas inlet line 292. Ammonia and hydrogen sulfide in the tail gases react to form ammonium bisulfide which dissolves in the injected water. The gas and water products in line 292 are cooled in an air cooler 294 and conveyed through a sponge absorber feed line 296 into a sponge oil absorber and low-temperature (LT) separator 106.

Lean sponge oil is fed into the sponge oil absorber 106 through a lean sponge oil line 300. In the sponge oil absorber, the lean sponge oil and the influent tail gases are circulated in a countercurrent extraction flow pattern. The sponge oil absorbs, extracts, and separates a substantial amount of methane and ethane and most of the $C_3$, $C_4$, $C_5$, and $C_6+$ light hydrocarbons (propane, butane, pentane, hexane, etc.) from the influent product stream. The sponge oil absorber operates at a temperature of about 130° F. and at a pressure of about 2700 psia. The effluent gases comprising hydrogen, methane, ethane, and hydrogen sulfide are withdrawn from the sponge oil absorber through a sponge oil effluent gas line 302 and fed into a high-pressure (HP) amine absorber 304.

Effluent water containing ammonium bisulfide is discharged from the bottom of the sponge oil absorber 106 through an effluent water line 306 and conveyed to a sour water flash drum, a sour water degassing drum, and/or other wastewater purification equipment and recycled or discharged.

Rich sponge oil effluent containing $C_3$, $C_4$, $C_5$, and $C_6+$ absorbed light hydrocarbons is discharged from the bottom portion of the sponge absorber 106 through a rich sponge oil line 308 and conveyed to a sponge oil flash drum 102. Vacuum naphtha and/or middle distillate can also be fed into the sponge oil (SO) flash drum through a sponge oil-naphtha line 312 as a stream to keep a level in the sponge oil system. In the sponge oil flash drum 102, the rich sponge oil is flashed and separated into light hydrocarbon gases and lean sponge oil. The flashed light hydrocarbon gases are withdrawn from the SO flash drum 102 through a gas line 314 and conveyed downstream for further processing. Lean sponge oil is discharged from the SO flash drum 102 through a lean sponge oil discharge line 316 and pumped (recycled) back to the sponge oil absorber via sponge oil pump 318 and line 300. Some of the lean sponge oil can also be used as the liquid quench. The ammonia-lean, $C_3+$ lean reactor tail gases containing hydrogen sulfide, hydrogen, methane, and residual amounts of ethane are fed into the high pressure (HP) amine absorber 304 through an amine absorber inlet line 302. Lean amine from the sulfur recovery unit (SRU) 319 lean amine discharge line 320 is pumped into the HP amine absorber 304 by a lean amine pump 322 through a lean amine inlet line 324. In the HP amine absorber 304, lean amine and influent tail gases are circulated in a countercurrent extraction flow pattern at a pressure of about 2500 psia. The lean amine absorbs, separates, extracts, and removes substantially all the hydrogen sulfide from the influent tail gases.

Rich amine containing hydrogen sulfide is discharged from the bottom of the HP amine absorber 304 through a rich amine line 326 and conveyed to a low-pressure (LP) amine absorber 328. The lean amine from the sulfur recovery unit is recycled back to the high-pressure and low-pressure amine absorbers through the lean amine line. Skimmed oil recovered in the HP amine absorber 304 is discharged from the bottom of the HP amine absorber through a high-pressure (HP) skimmed oil line 330 and passed to the LP amine absorber 328. Lean amine from the sulfur recovery unit (SRU) 319 is also pumped into the LP amine absorber 328 through a LP lean amine inlet line 332.

In the LP amine absorber 328, the influent products are separated into gases, rich amine, and skimmed oil. Gases are withdrawn from the LP amine absorber 328 through a gas line 334 and conveyed downstream through line 336 for use as sweet fuel or added to the fresh makeup gas through auxiliary gas line 338. Rich amine is discharged from the LP amine absorber 328 through a rich amine discharge line 340 and conveyed to a sulfur recovery unit (SRU) 319. Skimmed oil can also be withdrawn from the LP amine absorber and conveyed to the SRU 319 through line 340 or a separate line. The sulfur recovery unit can take the form of a Claus plant, although other types of sulfur recovery units can also be used. Sulfur recovered from the tail gases are removed from the tail gas cleanup equipment through sulfur recovery line 342.

In the HP amine absorber 304 of FIG. 3, the lean amine influent absorbs, separates, extracts and removes hydrogen sulfide from the influent stream leaving upgraded reactor tail gases (off gases). The upgraded reactor tail gases comprise about 70% to about 80% by volume hydrogen and about 20% to 30% by volume methane, although residual amounts of ethane may be present. The upgraded reactor tail gases are withdrawn from the high-pressure amine absorber through an overhead, upgraded tail gas line 350 and conveyed to a recycle compressor 352. The recycle compressor increases the pressure of the upgraded tail gases. The compressed tail gases are discharged from the compressor through a compressor outlet line 354. Part of the compressed gases can be passed through an antisurge line 284 and injected into the combined gas line 286 to control the inventory, flow and surging of medium-temperature gases being conveyed to the sponge oil absorber 106. Other portions of the gases prior to compression can be bled off through a bleed line or spill line 356 and used for fuel gas or for other purposes as discussed below.

Fresh makeup gases comprising at least about 95% hydrogen, preferably at least 96% hydrogen, by volume, from a hydrogen plant are conveyed through fresh makeup gas lines 358, 360, and 362 (FIG. 3) by a makeup gas compressor 364, along with gas from gas line 338, and injected, mixed, dispersed, and blended with the main portion of the compressed upgraded tail gases in a combined, common feed gas line 366. The ratio of fresh makeup gases to compressed recycle tail gases in the combined feed gas line 366 can range from about 1:2 to about 1:4.

About 10% by volume of the blended mixture of compressed, upgraded, recycled reactor tail gases (upgraded effluent off gases) and fresh makeup hydrogen gases in combined feed gas line 366 are bled off through a quench line 368 for use as quench gases. The quench gases are injected into the second and third ebullated bed reactors through the second reactor inlet quench line 70 and the third reactor inlet quench line 174 and are injected into the effluent hydrotreated product stream exiting the third reactor through quench line 208.

The remaining main portion, about 90% by volume, of the blended mixture of compressed, upgraded, recycled, reactor tail gases (upgraded off gases) and fresh makeup gases in the combined feed gas line 366 comprise the feed gases. The feed gases in the combined feed gas line 366 are preheated in a medium-temperature (MT) heat exchanger 282 (FIG. 3) and passed through a heat exchanger line 370 to a high-temperature (HT) heat exchanger 272 where the feed gases are further heated to a higher temperature. The heated feed gases are discharged from the HT heat exchanger 272 through a discharge line 194 and passed through a hydrogen heater 78 which heats the feed gases to a temperature ranging from about 650° F. to about 900° F. The heated hydrogen-rich feed gases exit the hydrogen heater 78 through a feed gas line 196 and are injected (fed) through an oil-gas line 76 into the first ebullated bed reactor 70.

Heavy coker gas oil from line 372 (FIG. 1), light vacuum gas oil from the light vacuum gas oil line 158 (FIG. 3), and/or heavy vacuum gas oil from the heavy vacuum gas oil lines 268 (FIG. 3), or 48 (FIG. 2) and possibly solvent extracted oil 172 (FIG. 1) are conveyed into an optional catalytic feed hydrotreater or catalytic feed hydrotreating unit (CFHU) 162 (FIG. 1) where it is hydrotreated with hydrogen from hydrogen feed line 380 at a pressure ranging from atmospheric pressure to 2000 psia, preferably from 1000 psia to 1800 psia at a temperature ranging from 650° F. to 750° F. in the presence of a hydro-treating catalyst. The hydrotreated gas oil is discharged through a catalytic feed hydrotreater discharge line 382.

Solvent-extracted deasphalted oil in SEU oil line 172 (FIG. 6) is fed and conveyed via a combined catalytic feed line 384 int the bottom portion of a catalytic cracking (FCC) reactor 386 of a fluid catalytic cracker (FCC) unit 34. Catalytic feed hydrotreated oil in line 382 and light atmospheric gas oil in RHU LGO gas oil line 156 and/or primary gas oil in line 33 from the primary tower 26 (pipestill) (FIG. 2) can also be fed and conveyed via combined catalytic feed line 384 into the bottom portion of the catalytic cracking reactor 386. Kerosene can be withdrawn from the catalytic feed hydrotreating unit 162 (FIG. 1) through CFHU kerosene line 387.

The catalytic cracking reactor 386 (FIG. 6) can have a stripper section. Preferably, the catalytic cracking reactor comprises a riser reactor. In some circumstances, it may be desirable to use a fluid bed reactor or a fluidized catalytic cracking reactor. Fresh makeup catalytic cracking catalyst and regenerated catalytic cracking catalyst are fed into the reactor through a fresh makeup and regenerated catalyst line 390, respectively. In the FCC reactor, the hydrocarbon feedstock is vaporized upon being mixed with the hot cracking catalyst and the feedstock is catalytically cracked to more valuable, lower molecular weight hydrocarbons. The temperatures in the reactor 386 can range from about 900° F. to about 1025° F. at a pressure from about 5 psig to about 50 psig. The circulation rate (weight hourly space velocity) of the cracking catalyst in the reactor 386 can range from about 5 to about 200 WHSV. The velocity of the oil vapors in the riser reactor can range from about 5 ft/sec to about 100 ft/sec.

Spent catalyst containing deactivating deposits of coke is discharged from the FCC reactor 386 (FIG. 6) through spent catalyst line 392 and fed to the bottom portion of an upright, fluidized catalyst regenerator or combustor 394. The reactor and regenerator together provide the primary components of the catalytic cracking unit. Air is injected upwardly into the bottom portion of the regenerator through an air injector line 396. The air is injected at a pressure and flow rate to fluidize the spent catalyst particles generally upwardly within the regenerator. Residual carbon (coke) contained on the catalyst particles is substantially completely combusted in the regenerator leaving regenerated catalyst for use in the reactor. The regenerated catalyst is discharged from the regenerator through regenerated catalyst line 390 and fed to the reactor. The combustion off-gases (flue gases) are withdrawn from the top of the combustor through an overhead combustion off-gas line or flue gas line 398.

Suitable cracking catalysts include, but are not limited to, those containing silica and/or alumina, including the acidic type. The cracking catalyst may contain other refractory metal oxides such as magnesia or zirconia. Preferred cracking catalysts are those containing crystalline aluminosilicates, zeolites, or molecular sieves in an amount sufficient to materially increase the cracking activity of the catalyst, e.g., between about 1 and about 25% by weight. The crystalline aluminosilicates can have silica-to-alumina mole ratios of at least about 2:1, such as from about 2 to 12:1, preferably about 4 to 6:1 for best results. The crystalline aluminosilicates are usually available or made in sodium form and this component is preferably reduced, for instance, to less than about 4 or even less than about 1% by weight through exchange with hydrogen ions, hydrogen-precursors such as ammonium ions, or polyvalent metal ions. Suitable polyvalent metals include calcium, strontium, barium, and the rare earth metals such as cerium, lanthanum, neodymium, and/or naturally-occurring mixtures of the rare earth metals. Such crystalline materials are able to maintain their pore structure under the high temperature conditions of catalyst manufacture, hydrocarbon processing, and catalyst regeneration. The crystalline aluminosilicates often have a uniform pore structure of exceedingly small size with the cross-sectional diameter of the pores being in a size range of about 6 to 20 angstroms, preferably about 10 to 15 angstroms. Silica-alumina based cracking catalysts having a major proportion of silica, e.g., about 60 to 90 weight percent silica and about 10 to 40 weight percent alumina, are suitable for admixture with the crystalline aluminosilicate or for use as such as the cracking catalyst. Other cracking catalysts and pore sizes can be used. The cracking catalyst can also contain or comprise a carbon monoxide (CO) burning promoter or catalyst, such as a platinum catalyst to enhance the combustion of carbon monoxide in the dense phase in the regenerator 394.

The effluent product stream of catalytically cracked hydrocarbons (volatized oil) is withdrawn from the top of the FCC reactor 386 (FIG. 6) through an overhead product line 400 and conveyed to the FCC main fractionator 402. In the FCC fractionator 402, the catalytically cracked hydrocarbons comprising oil vapors and flashed vapors can be fractionated (separated) into light hydrocarbon gases, naphtha, light catalytic cycle oil (LCCO), heavy catalytic cycle oil (HCCO), and decanted oil (DCO). Light hydrocarbon gases are withdrawn from the FCC fractionator through a light gas line 404. Naphtha is withdrawn from the FCC fractionator through a naphtha line 406. LCCO is withdrawn from the FCC fractionator through a light catalytic cycle oil line 408. HCCO is withdrawn from the FCC fractionator through a heavy catalytic cycle oil line 410. Decanted oil is withdrawn from the bottom of the FCC fractionator through a decanted oil line 186.

In order to help minimize and decrease the concentration of carbonaceous asphaltenic solids formed during resid hydrotreating, some of the decanted oil from decanted oil line 186 can be injected into the combined feed line 182 (FIG. 3) as part of the feedstock being fed to the ebullated bed reactor 70. Alternatively or in addition thereto, some of the decanted oil from line 186 can be fed into the atmospheric tower 82 via atmospheric decanted oil line 412 and/or into the vacuum tower 84 via vacuum decanted oil line 414 to minimize precipitation and conglomeration of asphaltenic solids in the towers 82 and 84. For best results, the total amount of diluent (decanted oil) injected into the atmospheric and vacuum towers 82 and 84 ranges from about 5% to less than 20%, and preferably from about 7% to about 12%, by weight of the influent resid oil feedstock.

Alternatively, in the main fractionator 402, the oil vapors and flashed vapors can be fractionated (separated) into: (a) light hydrocarbons having a boiling temperature less than about 430° F., (b) light catalytic cycle oil (LCCO), and decanted oil (DCO). The light hydrocarbons can be withdrawn from the main fractionator through an overhead line and fed to a separator drum. In the separator drum, the light hydrocarbons can be separated into (1)wet gas and (2) $C_3$ to 430° F. light hydrocarbon material comprising propane, propylene, butane, butylene, and naphtha. The wet gas can be withdrawn from the separator drum through a wet gas line and further processed in a vapor recovery unit (VRU). The $C_3$ to 430-° F. material can be withdrawn from the separator drum through a discharge line and passed to the vapor recovery unit (VRU) for further processing. LCCO can be withdrawn from the main fractionator through an LCCO line for further refining, processing, or marketing. Decanted oil (DCO) can be withdrawn from the main fractionator through one or more DCO lines for further use. Slurry recycle comprising DCO can be pumped from the bottom portion of the main fractionator by pump through a slurry line for recycle to the catalytic reactor 386. Other portions of the DCO can be fed to the resid hydrotreating unit 60 and/or the fractionating towers 82 and 84 as described previously. The remainder of the DCO can be conveyed through for further use in the refinery.

Spent deactivated (used) coked catalyst can be discharged from the catalytic cracking reactor 386 (FIG. 6) and stripped of volatilizable hydrocarbons in the stripper section with a stripping gas, such as with light hydrocarbon gases or steam. The stripped coked catalyst is passed from the stripper through spent catalyst line 392 into the regenerator 394. Air is injected through air injector line 394 into the regenerator 22 at a rate of about 0.2 ft/sec to about 4 ft/sec. Preferably, excess air is injected in the regenerator 394 to completely convert the coke on the catalyst to carbon dioxide and steam. The excess air can be from about 2.5% to about 25% greater than the stoichiometric amount of air necessary for the complete conversion of coke to carbon dioxide and steam.

In the regenerator 394 (FIG. 6), the coke on catalyst is combusted in the presence of air so that the catalyst contains less than about 0.1% coke by weight. The coked catalyst is contained in the lower dense phase section of the regenerator, below an upper dilute phase section of the regenerator. Carbon monoxide can be combusted in both the dense phase and the dilute phase although combustion of carbon monoxide predominantly occurs in the dense phase with promoted burning, i.e., the use of a CO burning promoter. The temperature in the dense phase can range from about 1150° F. to about 1400° F. The temperature in dilute phase can range from about 1200° F. to about 1510° F. The stack gas (combustion gases) exiting the regenerator 394 through overhead flue line 398 preferably contains less than about 0.2% CO by volume (2000 ppm). The major portion of the heat of combustion of carbon monoxide is preferably absorbed by the catalyst and transferred with the regenerated catalyst through a regenerated catalyst line 390 into the catalytic cracking reactor 386.

In a catalytic cracker (reactor) 386, some non-volatile carbonaceous material, or coke, is deposited on the catalyst particles. Coke comprises highly condensed aromatic hydrocarbons which generally contain 4-10 wt. % hydrogen. As coke builds up on the catalyst, the activity of the catalyst for cracking and the selectivity of the catalyst for producing gasoline blending stock diminish. The catalyst particles can recover a major proportion of their original capabilities by removal of most of the coke from the catalyst by a suitable regeneration process.

Catalyst regeneration is accomplished by burning the coke deposits from the catalyst surface with an oxygen-containing gas such as air. The burning of coke deposits from the catalyst requires a large volume of oxygen or air. Oxidation of coke may be characterized in a simplified manner as the oxidation of carbon and may be represented by the following chemical equations:

a. $C + O_2 \rightarrow CO_2$
b. $2C + O_2 \rightarrow 2CO$
c. $2CO + O_2 \rightarrow 2CO_2$ Reactions (a) and (b) both occur at typical catalyst regeneration conditions wherein the catalyst temperature may range from about 1050° F. to about 1300° F. and are exemplary of gas-solid chemical interactions when regenerating catalyst at temperatures within this range. The effect of any increase in temperature is reflected in an increased rate of combustion of carbon and a more complete removal of carbon, or coke, from the catalyst particles. As the increased rate of combustion is accompanied by an increased evolution of heat whenever sufficient oxygen is present, the gas phase reaction (c) may occur. This latter reaction is initiated and propagated by free radicals. Further combustion of CO to $CO_2$ is an attractive source of heat energy because reaction (c) is highly exothermic.

As shown in FIG. 7, resid hydrotreated vacuum tower bottoms (i.e., hydrotreated resid from the vacuum tower) in RHU VTB line 166 is fed into the coker (coking vessel) 420. Solvent-extracted asphaltenes in the SEU asphaltene line 180 can also be conveyed to the coker 420. In the coker 420, the vacuum tower bottoms and solvent-extracted asphaltenes are coked at a coking temperature of about 895° F. to about 915° F. at a pressure of about 10 psig to about 50 psig. Coke is withdrawn from the coker 420 through chute, conduit, or line 422 and transported to a coke storage area for use as solid fuel.

Coker product vapors can be withdrawn from the coker 420 (FIG. 7) through line 424 and passed (fed) to a combined coker tower 426. In the combined coker tower 426, the coker product vapors can be separated into fractions of coker gas, coker naphtha, light coker gas oil, and heavy coker gas oil. Coker gas can be withdrawn from the combined tower 426 through coker gas line 428. Coker naphtha can be withdrawn from the combined tower 426 through coker naphtha line 430. Light coker gas oil can be withdrawn from the combined tower 426 through light coker gas line 432. Heavy coker gas oil can be withdrawn from the combined tower 426 through heavy coker gas oil line 372 and hydrotreated in the catalytic feed hydrotreater (CRHU) 162 (FIG. 1) before being catalytically cracked in the catalytic cracker 34 (FCCU).

The solvent extraction deasphalting unit 170 (SEU) of FIG. 8 comprises a mixer 440 and three separator vessel or zones 442, 444, and 446 operated slightly below or above the supercritical condition of the solvent. As shown in FIG. 8, resid hydrotreated vacuum tower bottoms (i.e., hydrotreated resid from the vacuum tower) in RHU VTB line 168 is conveyed to the mixer, mixing vessel, or mixing zone 440. Fresh makeup solvent in fresh solvent line 448 is pumped through a combined solvent line 450 into the mixer 440. Recycled solvent in recycle solvent line 452 is also pumped through the combined solvent line 450 into the mixer 440. For best results, the solvent comprises substantially pentane and/or butane. The total solvent (fresh and recycle solvent) to feed (vacuum tower bottoms) ratio is from about 3:1 to about 20:1 and preferably from about 8:1 to about 12:1 for best results. In some circumstances it may be desirable to use or include other solvents.

In the preferred embodiment, only a minority of the solvent is mixed with the vacuum tower bottoms in mixer 440. The remainder of the solvent is injected countercurrently to the vacuum tower bottoms at the bottom portion of the separator 442 in order to obtain countercurrent extraction of the asphaltenes in vessel (first separator) 442.

The vacuum tower bottoms and solvent are mixed in the mixer 440 (FIG. 8) and conveyed through a resid-solvent line 453 to the first separator vessel or zone 442. In some circumstances it may be desirable that the vacuum tower bottoms and solvent be fed directly into the first separator 442 in the above ratios without previously mixing the vacuum tower bottoms and solvent.

In the first separator (asphaltene separator) 442 (FIG. 8) the SEU asphaltenes containing a substantial amount of organometallic components are solvent-extracted and separated from the mixture of solvent and hydrotreated resid (vacuum tower bottoms). A substantial amount of the solvent-extracted asphaltenes are withdrawn from the first separator 442 through SEU asphaltene line 176 and conveyed or otherwise transported to a solids fuel area 178 (FIG. 1) for use as solid fuel. Some of the solvent-extracted asphaltenes are withdrawn from the first separator and conveyed or otherwise transported through SEU asphaltene line, conduit, or chute 180 to the coker unit 164.

The first separator 442 can be operated at a temperature from about 150° F. to above the critical temperature of the solvent and a pressure at least equal to the vapor pressure of the solvent when at a temperature below the critical temperature of the solvent and at least equal to the critical pressure of the solvent when at a temperature equal to or above the critical temperature of the solvent. Preferably, the operating temperature of the first separate 442 ranges from about 20° F. below the critical temperature of the solvent to about the critical temperature of the solvent and the operating pressure of the first separator 442 is the same as the third separator 446 plus pressure drops between the vessels 442 and 446.

The majority of solvent and the remaining resins and oil components of the hydrotreated resid are withdrawn from the first separator 442 (FIG. 8) and conveyed through residue line 454 and a heater or heat exchanger to the second separator vessel or zone 444. The second separator 444 is maintained at a temperature level higher than the temperature level in the first separator 442 and at the same pressure as the first vessel 442 minus any pressure drops between vessels 442 and 444, to effect a separation of the influent residue into a fluid-like second light phase comprising oils and solvent and a fluid-like second heavy phase comprising resins and a minority of the solvent. The second light phase which separates within second separator 444 collects in an upper portion of the second separator 444. In the second separator (resin separator) 444, deasphalted resins are solvent-extracted and separated from the influent residue. The solvent-extracted deasphalted resins are discharged from the second separator 444 through an SEU resin line 174 and fed to the ebullated bed reactor of the resid hydrotreating unit as part of the feed as discussed previously. Some of the resins can be recycled to the second separator 444 through a recycle resin line 456. The recycled resins contacts the second light phase of oil and solvent and thereafter settles through the second light phase. This reflux action improves the efficacy of the separation occurring in the second separator 442, which tends to concentrate RAMS carbon and metals in the resins fraction. The recycled resins can be passed into the upper portion of second separator 444 through a nozzle or other suitable device which disperses the second heavy phase of resins as substantially uniform droplets. The droplets are of sufficient size to facilitate their settling through the rising second light phase comprising oils and solvent. The second separator 444 can contain a packaging material, such as Demister packing, Pall rings, Raschig rings or the like.

In the preferred embodiment, the second separator 444 is operated at a temperature above that in the first separator 442. The pressure level of second separator 444 is maintained equal to the vapor pressure of the first separator 442 minus any pressure drop between the vessels 442 and 444 so that flow between the vessels 442 and 444 can occur through overflow and not require the use of a pump. However, if desired, a pump could be used since vapor-liquid equilibrium would allow the first vessel 442 to be operated at a pressure below that of second vessel 444. Preferably, the operating temperature of the second separator 444 is from about 5° F. to about 100° F. above the temperature in the first separator 442, and most preferably at a temperature of from about 5° F. to about 50° F. above the critical temperature of the solvent, and the operating pressure of the second separator 444 is substantially the same pressure level as is maintained in first separation zone 442.

The remaining residue of solvent and oil are withdrawn from the second separator 444 (FIG. 8) through a second residue line 458 and passed via a heater or heat exchanger to the third separator vessel or zone 446. In the third separator (oil separator) 446 substantially deasphalted demetallized resin-free (deresined) oil is separated from the solvent. The third separator 446 is operated at an elevated temperature to effect a separation of the oil and solvent. The temperature in the third separator 446 is higher than the temperature in the second separator 444 and above the critical temperature of the solvent. The pressure in the third separator 446 is preferably at least equal to the critical pressure of the solvent. Preferably, the temperature in the third separator 446 is maintained at least about 50° F. above the critical temperature of the solvent.

The third separator 446 acts a flash drum flash zone in which solvent is separated from the oil. When operating at supercritical condition, no heat of vaporization is required to separate the solvent from the SEU oil thereby enhancing the energy efficacy of the deasphalter.

The solvent is withdrawn from the third separator 446 (FIG. 8) and recycled through lines 452 and 450 into the mixer 440. The solvent-extracted oil (SEU oil) is discharged from the third separator 446 through an SEU oil line 172 and fed to the catalytic cracker (FCCU) as part of its feedstock as previously described.

The first, second and third heavy phases of asphaltenes, resins, and SEU oil, respectively, can be passed into individual stripping sections, such as steam strippers, to strip any solvent that may be contained in the phases. The recovered solvent can be recycled (pumped) through line 452. The recovered solvent can optionally be passed through a cooler, heater, or other heat exchanger as well as a surge drum before being pumped through the recycle line 452.

The two stage solvent extraction unit of FIG. 9 is similar in many respects to the three stage solvent extraction unit of FIG. 8, except that the solvent is separated from the mixture of SEU oil and resins in the second separator vessel or zone 444 and the SEU oils and resins are commingled in effluent line 174. In processing certain resids, it may be advantageous to send the admixture of resins and SEU oils to a catalytic cracking unit, to a catalytic feed hydrotreater for catalytic cracker feed, or to the ebullated bed reactors of the resid hydrotreating unit.

Alternatively, the mixture of vacuum tower bottoms and solvent from the mixing zone can be passed to a first separation zone comprising a closed vessel which is maintained under temperature and pressure conditions sufficient to permit three separate liquid fractions, of different densities, to form in the first separation zone and to permit a liquid-liquid interface to form between each adjacent fraction. In order to permit the separation of three fractions, the first separation zone is operated at a temperature within about 30° F. of the critical temperature of the solvent, and at a pressure at or above the critical pressure of the solvent, preferably within about 300 psi above the critical pressure of the solvent.

The solvent-process material mixture can separate into an asphaltene-rich first heavy fraction which collects in the lower portion of the first separation zone and a resin-rich intermediate fraction which collects immediately above the first heavy fraction. The asphaltene and resin fractions contact at a first liquid-liquid interface. Collecting immediately above the intermediate fraction is a first light fraction which is rich in solvent and oils. The resin and oil fractions contact at a second liquid-liquid interface.

The first heavy fraction of asphaltenes can be withdrawn from the lower portion of the first separation zone and stripped of its residual solvent in a solvent recovery zone, such as a stripper. The intermediate fraction of resins can be withdrawn from the middle portion of the first separation zone and stripped of its residual solvent in a solvent recovery zone, such as a stripper. The first light fraction of oil and solvent can be withdrawn from the first separation zone and passed to a second separation zone where the oil and solvents light fraction is separated into a second heavy fraction rich in SEU oil and a second light fraction rich in solvent. Optionally, prior to its introduction into the second separation zone, the first light fraction of oil and solvent can be passed through a heater which raises the temperature of the first oil and solvent fraction to a temperature above that of the first separation zone and above the critical temperature of the solvent. Liquid leaving the heater is passed to the second separation zone which is at a temperature above that of the first separation zone and above the critical temperature of the solvent, and at a pressure approximately equal to that of the first separation zone. Under the supercritical or near-supercritical conditions in the second separation zone, the SEU oil fraction separates from the solvent fraction. The SEU oil fraction is withdrawn from the lower portion of the second separation zone and is stripped of its residual solvent in a solvent recovery zone, such as a stripper. The recovered stripped solvent is recycled to the mixer.

It was unexpectedly and surprisingly found that the conversion and hydrotreating of 1000° F. resid (resid feed oil) and the catalytic cracking of oils to more valuable lower-boiling liquid products can be significantly and substantially increased by the use of solvent-extracted deasphalted resins and solvent-extracted deasphalted oil, respectively.

EXAMPLE 1

Vacuum-reduced crude (resid oil) was hydrotreated in a resid hydrotreating unit similar to that shown in FIG. 3 under operating conditions similar to that described previously in this patent application. The vacuum tower bottoms (hydrotreated resid) were separated by solvent extraction into fractions of asphaltenes, (deasphalted) resins, and (deasphalted) deresined SEU oil. The composition of the hydrotreated resid, asphaltenes, resins, and SEU oil are shown in Table 1.

TABLE 1

|  | Hydrotreated Resid | SEU Oil | Deasphalted Resins | Asphaltenes |
|---|---|---|---|---|
| Wt % of Hydrotreated Res'd | 100 | 41 | 35 | 24 |
| °API | 1 | 18 | −4 | −20 |
| $C_A$ (aromatic carbon) | 48 | 20 | 54 | 80 |
| Ramscarbon | 29 | 1 | 36 | 68 |
| Carbon (wt %) | 87.7 | 86.9 | 87.9 | 88.9 |
| Hydrogen (wt %) | 9.3 | 12.0 | 8.4 | 6.0 |
| Nitrogen (wt %) | 0.6 | 0.02 | 1.0 | 1.2 |
| Sulfur (wt %) | 1.2 | 0.8 | 1.3 | 1.7 |
| Metals (ppm) | 130 | 2 | 9 | 500 |

Table 1 shows the chemical compositions of fractions of SEU oil, resins, and deresined asphaltenes. Hydrotreating increases the concentration of SEU oil in the hydrotreated resid. This is evidenced by the 40% concentration of oils in the hydrotreated resid of Table 1 versus a 25% concentration of oil found typically in prior art virgin high sulfur resid when deasphalted by an identical procedure.

Advantageously and unexpectedly, recycling of the deasphalted resins to the resid hydrotreating unit inhibited the formation of carbonaceous solids. Hydrotreating the deasphalted resins produced a good 1000° -F. yield. The deasphalted resins also have less tendency to foul the hydrotreating catalyst than virgin or previously hydrotreated whole resid.

EXAMPLE 2

Prior art gas oil and some of the solvent-extracted oil of Example 1 were each separately catalytically cracked in a catalytic microcracking unit at a temperature of 900° F., at a pressure of 25 psia, and using a catalyst to oil ratio of 5:1 by wt. Very little permanent fouling of the cracking catalyst would occur because of the low metals content of the SEU oil. The conversion of SEU oil to more valuable hydrocarbons was about 91.2 wt % while the conversion of gas oil to more valuable hydrocarbons was only 67.8 wt %. The liquid yield of SEU oil was about 115 vol % and the liquid yield of gas oil was about 108 vol %. The composition and results of catalytically cracking the gas oil and SEU oil are shown in Table 2 below. The total liquid yield from catalytic cracking of SEU oil and recycling the deasphalted resins based on the tests of Examples 1 and 2 were 50 vol % greater than compared to the prior art method of coking the vacuum tower bottoms.

TABLE 2

| Wt % | Gas Oil | SEU Oil |
|---|---|---|
| $H_2$, $C_1$, $C_2$ | 1.7 | 5.6 |
| $C_3$, $C_4$ | 13.0 | 22.5 |
| $C_5$-430° F. | 47.9 | 57.3 |
| >430° F. | 32.2 | 8.8 |
| Coke | 3.9 | 5.2 |
| $H_2S$ | 1.3 | 0.6 |
| Conversion (wt %) | 67.8 | 91.2 |
| Volume Yield (%) | 108.0 | 115.0 |

EXAMPLE 3

A feed comprising vacuum-reduced crude (resid oil) and decanted oil (DCO) was hydrotreated in a resid hydrotreating unit similar to that shown in FIG. 3 under operating conditions similar to that described previously in the patent application. The vacuum tower bottoms (hydrotreated resid) was separated by solvent extraction into fractions of deasphalted deresined SEU oil, deasphalted resins, and deresined asphaltenes with a solvent comprising substantially butane. Butane can be obtained from a reformer or catalytic cracker. The solvent to hydrotreated resid feed ratio and operating conditions of the solvent extraction unit were similar to that described previously in the patent application. The composition and results of solvent extracting with butane are shown in Table 3.

TABLE 3

| Solvent: Butane | | | |
|---|---|---|---|
|  | Feed | SEU Oil and Deasphalted Resin | Asphaltenes |
| Yield wt % | — | 37.2 | 62.8 |
| Ring & Ball Softening Point °F. (ASTM Test E28) | — | 120.0 | 284.0 |
| Conradson Carbon wt % | 41.7 | 8.4 | 61.7 |
| Ramscarbon wt % | 38.7 | 7.2 | 57.4 |
| Carbon wt % | 87.35 | 86.47 | 89.13 |
| Hydrogen wt % | 8.86 | 11.51 | 7.19 |
| Hydrogen/Carbon ratio | 1.19 | 1.60 | 0.97 |
| Sulfur wt % | 2.62 | 1.58 | 3.27 |
| Nitrogen wt % | 0.77 | 0.32 | 1.04 |
| Nickel ppm | 69 | <1 | 107 |
| Vanadium ppm | 158 | 1 | 231 |
| Ash wt % | — | — | 0.17 |

EXAMPLE 4

A test was conducted in a manner similar to Example 3 except the solvent comprised substantially pentane. The composition and results of solvent extracting with pentane are shown in Table 4. Pentane can be obtained from a depentanizer of an aromatics recovery unit.

TABLE 4

| Solvent: Pentane | | | |
|---|---|---|---|
|  | Feed | SEU Oil | Deasphalted Resin | Deas-Asphaltenes |
| Yield wt % | — | 29.8 | 19.8 | 51.4 |
| Ring & Ball Softening Point °F. (ASTM Test E28) | — | 137.0 | 104.0 | 325.0 |
| Conradson Carbon wt % | 41.7 | 11.8 | 19.4 | 69.5 |
| Ramscarbon wt % | 38.7 | 10.6 | 18.3 | 62.1 |
| Carbon wt % | 87.35 | 86.59 | 86.91 | 89.48 |
| Hydrogen wt % | 8.86 | 11.10 | 10.38 | 6.78 |
| Hydrogen/Carbon ratio | 1.19 | 1.54 | 1.43 | 0.91 |
| Sulfur wt % | 2.62 | 1.81 | 2.17 | 3.46 |
| Nitrogen wt % | 0.77 | 0.39 | 0.52 | 1.02 |
| Nickel ppm | 69 | <1 | 3 | 131 |

TABLE 4-continued

| | Solvent: Pentane | | |
|---|---|---|---|
| | Feed | SEU Oil | Deasphalted Resin | Deas-Asphaltenes |
| Vanadium ppm | 158 | <1 | 5 | 293 |
| Ash wt % | — | — | — | 0.24 |

EXAMPLE 5

The incremental yields for recycling deasphalted resins into the resid hydrotreating unit per 100 barrels of vacuum tower bottoms processed in the solvent extraction unit based on a separation of about 44.50 barrels of resins, 35.34 barrels of SEU oil, and 20.16 barrels of deresined asphaltenes, are shown in Table 5.

TABLE 5

| | FEED (barrels) | PRODUCT (barrels) |
|---|---|---|
| $H_2$ (fuel oil equivalent) | 2.97 | |
| Deasphalted Resins | 44.50 | |
| RHU Gases (wt % on feed) | | 3.05 |
| Light Distillate | | 7.33 |
| Naphtha | | 6.28 |
| MidDis/LGO | | 7.33 |
| LVGO/HVGO | | 14.40 |
| Vacuum Tower Bottoms | | 13.61 |

The composition of the products of Example 5 and Table 5 are shown in Tables 6 and 7.

TABLE 6

| | °API | WT % Sulfur | WT % Rams-carbon | WT % Nitrogen |
|---|---|---|---|---|
| Naphtha | 53.0 | 0.01 | — | 0.02 |
| Lt Distillate | 32.0 | 0.06 | — | 0.04 |
| MidDis/LGO | 28.0 | 0.15 | — | 0.08 |
| LVGO/HVGO | 18.0 | 1.00 | 0.9 | 0.40 |
| VTB | 0.8 | 1.20 | 29.0 | 0.60 |
| SEU Oil | 16.0 | 0.80 | 0.02 | 0.02 |
| Deasphalted Resins | 1.0 | 1.20 | 27.0 | 0.60 |
| Deresined Asphaltenes | −20 | 1.70 | 70.0 | 1.40 |

TABLE 7

| | $C_A$ (NDM) Aromatic Carbons | PPM Vanadium | PPM Nickel | WT % 1000 + °F. |
|---|---|---|---|---|
| Naphtha | 10.0 | — | — | 0 |
| Lt Distillate | 11.0 | — | — | 0 |
| MidDis/LGO | 13.0 | — | — | 0 |
| LVGO/HVGO | 20.0 | — | — | ~9 |
| VTB | 32.0 | 75 | 40 | >90 |
| SEU Oil | 6.7 | 0 | 2 | 80 |
| Deasphalted Resins | 36.0 | 6 | 3 | 100 |
| Deresined Asphaltenes | 58.0 | 303 | 159 | 100 |

EXAMPLE 6

Incremental flow changes expressed in thousand barrels per calendar day (MBCD) were determined for the refinery process flow diagram of FIG. 1 with a three stage solvent extraction unit similar to FIG. 8 based upon changing the initial catalytic cracking feed into the catalytic cracking unit from: (a) 81.15 MBCD hydrotreated gas oil from the catalytic feed hydrotreater (CFHU), 11 MBCD primary gas oil from the pipestill, 9 MBCD light gas oil and 8 MBCD mid-distillate oil from the resid hydrotreating unit (RHU) to (b) 4.05 MBCD SEU oil from the three stage solvent extraction unit, 79.74 MBCD hydrotreated oil from the CFHU, 11 MBCD primary gas oil from the pipestill, and 17.84 MBCD light gas oil and mid-distillate oil from the RHU; and (c) based upon increasing a 60 MBCD RHU feed comprising by volume, 75% vacuum reduced crude (virgin resid oil), 12.5% decanted oil, 7.5% recycled flash drum oil, and 5% gas oil, with an additional 5.1 MBCD deasphalted SEU resins from the three stage solvent extraction unit and (d) based with a pentane solvent in the three stage solvent extraction unit. The incremental flow changes in FIG. 1 expressed in MBCD are shown in Table 8 (the line numbers correspond to the part numbers shown on FIG. 1).

TABLE 8

| | Incremental Increase in Flow | |
|---|---|---|
| Stream | Line | Flow Increase (MBCD) |
| SEU resins | 174 | 5.10 |
| SEU oil | 172 | 4.05 |
| Deresined asphaltenes | 176 | 2.31 |
| Hydrogen to RHU (fuel oil equivalent) | 96 | 0.34 |
| RHU gases (fuel oil equivalent) | 150 | 0.35 |
| Naphtha | 152 | 0.72 |
| RHU LGO | 156 | 0.84 |
| LVGO/HVGO | 158 | 1.65 |
| RHU VTB | 160 | 1.56 |
| VTB to SEU | 168 | 11.46 |
| Solvent (pentane) | 450 | 0.23 |
| VTB to Coker | 166 | −9.90 |
| Coker gas | 428 | −0.65 |
| Coker naphtha | 430 | −0.52 |
| Heavy coker gas oil | 372 | −3.79 |
| Light coker gas oil | 432 | −0.80 |
| Coke (fuel oil equivalent) | 422 | −5.05 |
| Hydrogen to CFHU (fuel oil equivalent) | 380 | −0.04 |
| CFHU Kerosene | 387 | −0.80 |
| Hydrotreated oil to FCCU | 382 | −1.41 |
| FCCU gases | 404 | 0.83 |
| Catalytic naphtha | 406 | 2.37 |
| LCCO | 408 | 0.80 |
| Decanted Oil (DCO) | 410 | 0.17 |

EXAMPLE 7

Ardeshir vacuum virgin, unhydrotreated resid was solvent extracted and separated into SEU oil, deasphalted SEU resins, and deresined SEU asphaltenes. The composition was determined by liquid chromatography. The results are shown in Table 9.

TABLE 9

| Ardeshir Vacuum Resid (Feed) | | | |
|---|---|---|---|
| | SEU Oil | SEU Resins | SEU Asphaltenes |
| Wt % of Feed | 24.7 | 62.3 | 11.8 |
| Aromatic Carbons $C_A$ wt % | 14.0 | 40.0 | 57.0 |
| H/C atomic ratio | 1.74 | 1.37 | 1.10 |
| Sulfur wt % | 2.05 | 5.92 | 7.85 |
| Nitrogen wt % | 0.01 | 0.55 | 0.99 |
| Nickel ppm | — | 57 | 310 |
| Vanadium ppm | — | 154 | 700 |

The data in Table 9 pertain to a virgin high sulfur resid, whose properties are typical of prior art feedstocks to resid hydrotreating units. In Example 7, the virgin resid was deasphalted under similar conditions to the hydrotreated resid of Example 1. In contrasting the yields and qualities of the virgin resid of Table 9 and hydrotreated resids of Table 1, it is evident that:

1. The fraction of SEU oil is increased for the hydrotreated resid of Table 1.

2. Most of the metals, and the majority of the sulfur has been removed from the SEU oils and resins of the hydrotreated resid in Table 1.

3. The metals, and to a lesser extent the sulfur and nitrogen, are concentrated in the asphaltene fraction of Table 1.

4. The asphaltenes become more refractory, deficient in hydrogen and abundant in RAMS carbon, following hydrotreating.

The yields and qualities of the deasphalted SEU oil, resins, and asphaltenes vary considerably with the solvent used in deasphalting and the deasphalting conditions. However, the property ranges given for deasphalted SEU oil, deasphalted resins, and deresined asphaltenes are appropriate for a broad range of process conditions in the use of deasphaltenes.

It is understood that the qualities of the deasphalted oil, deasphalted resin, and deresined asphaltene fractions can be adjusted somewhat by altering processing conditions in the deasphalter, and this adjustment is analogous to raising or lowering the cut points on a distillation tower in order to obtain the product qualities desired.

Among the many advantages of the resid hydrotreating process are:

1. Increased conversion of the 1000+° F. resid to more valuable lower boiling, hydrocarbons.
2. Superior process efficiency.
3. Outstanding catalytic cracking and resid hydrotreating effectiveness.
4. Increased product yield.
5. Better product quality.
6. Improved operability.
7. Enhanced economy and profitability.
8. Good Ramscarbon removal.
9. Excellent desulfurization.
10. Good demetallation.
11. Reduce costs of catalyst replacement in the resid hydrotreating unit.
12. Substantial decrease of carbonaceous solids in the oil product.

Although embodiments of this invention have been shown and described, it is to be understood that various modifications and substitutions, as well as rearrangements and combinations of process steps and equipment, can be made by those skilled in the art without departing from the novel spirit and scope of this invention.

We claim:

1. A hydrotreating process, comprising the steps of:
   feeding a first feed stream comprising resid to a combined feed line upstream of a reactor
   feeding a separate second stream comprising recycled substantially deasphalted solvent-extracted resins to said combined feed line upstream of said reactor
   mixing said first stream comprising said resid and said second stream comprising said recycled deasphalted solvent-extracted resins in said combined feed line;
   feeding said mixed first stream comprising said resid and said second stream comprising said recycled deasphalted resin to said reactor;
   feeding hydrotreating catalyst to said reactor;
   injecting hydrogen-rich gases into said reactor; and
   hydrotreating said mixed first stream comprising said resid and said second stream comprising said recycled deasphalted solvent-extracted resins in said reactor by contacting said mixed first stream comprising said resid and said second stream comprising said recycled deasphalted solvent-extracted resins with said hydrogen-rich gases in the presence of said hydrotreating catalyst under hydrotreating conditions to produce hydrotreated oil;
   fractionating said hydrotreated oil in a fractionator to produce gas oil and resid bottoms;
   substantially separating said resid bottoms by solvent extraction into one stream comprising asphaltenes and said second stream comprising said substantially deasphalted solvent-extracted resins; and
   recycling said second stream comprising said recycled deasphalted solvent-extracted resins to said combined feed line upstream of said reactor.

2. A hydrotreating process in accordance with claim 1 wherein said fractionator is selected from the group consisting of an atmospheric tower and a vacuum tower.

3. A hydrotreating process in accordance with claim 1 wherein at least part of said separation takes place under supercritical conditions.

4. A hydrotreating process in accordance with claim 1 including recovering and recycling said solvent wherein said second stream comprises substantially deasphalted sovent-extracted oil.

5. A hydrotreating process in accordance with claim 1 wherein said asphaltenes are fed to a coker.

6. A hydrotreating process in accordance with claim 1 wherein said asphaltenes are transported for use as solid fuel.

7. A hydrotreating process in accordance with claim 1 wherein said resid bottoms are sequentially separated in at least two vessels and said separation includes recovering and recycling said solvent.

8. A hydrotreating process in accordance with claim 1 wherein said separation includes separating substantially deasphalted solvent-extracted oil from said resid bottoms and feeding said deasphalted solvent-extracted oil to a catalytic cracker.

9. A hydrotreating process, comprising the steps of:
   substantially desalting crude oil;
   heating said desalted crude oil in a pipestill furnace;
   pumping said heated crude oil to a primary distillation tower;
   separating said heated crude oil in said primary distillation tower into streams of naphtha, kerosene, primary gas oil, and primary reduced crude oil;
   pumping said primary reduced crude oil to a pipestill vacuum tower;
   separating said primary gas oil in said pipestill vacuum tower into streams of wet gas, heavy gas oil, and vacuum reduced crude oil providing resid oil;
   feeding a resid oil feed comprising solvent-extracted resins and said resid oil from said pipestill vacuum tower to a resid hydrotreating unit comprising a series of three ebullated bed reactors;
   injecting hydrogen-rich gases into said ebullated bed reactors;
   conveying resid hydrotreating catalysts to said ebullated bed reactors;
   ebullating said feed comprising said solvent-extracted resins and said resid oil with said hydrogen-rich gases in the presence of said resid hydrotreating catalyst in said ebullated bed reactors under hydrotreating conditions to produce upgraded hydrotreated resid oil;
   separating at least a portion of said hydrotreated resid oil in an atmospheric tower into atmospheric streams of distillate, atmospheric gas oil, and atmospheric tower bottoms comprising atmospheric resid oil;

separating said atmospheric resid oil in a resid vacuum tower into vacuum streams of vacuum gas oil and vacuum tower bottoms comprising vacuum resid oil;

conveying and feeding a substantial portion of said vacuum tower bottoms from said resid vacuum tower to a multistage solvent extraction unit;

feeding a solvent to said multistage solvent extraction unit, said solvent comprising a member selected from the group consisting of butane and pentane;

substantially deasphalting and solvent-extracting said vacuum tower bottoms with said solvent in said multistage solvent extraction unit to substantially separate said vacuum tower bottoms into streams of substantially deasphalted solvent-extracted oil, substantially deasphalted solvent-extracted resins, and substantially deresined solvent-extracted asphaltenes;

recovering said solvent under supercritical conditions and recycling said solvent to said solvent extraction unit;

transporting at least some of said solvent-extracted asphaltenes for use as solid fuel; and conveying said solvent-extracted resins from said solvent extraction unit to said resid hydrotreating unit as part of said resid oil feed.

10. A hydrotreating process in accordance with claim 9 including:

feeding said atmospheric gas oil from said atmospheric tower to a cracking reactor of a catalytic cracking unit, said cracking reactor comprising at least one reactor selected from the group consisting of a riser reactor and a catalytic cracker;

feeding primary gas oil from said primary tower to said cracking reactor;

feeding said solvent-extracted oil from said solvent extraction unit to said cracking reactor;

feeding fresh and regenerated cracking catalyst to said cracking reactor;

catalytically cracking said gas oil and said solvent-extracted oil in said cracking reactor in the presence of said cracking catalyst under catalytic cracking conditions to produce cracked oil leaving spent coked catalyst;

conveying said spent coked catalyst to a regenerator of said catalytic cracking unit;

injecting air into said regenerator;

regenerating said spent catalyst by substantially combusting coke on said spent catalyst in the presence of air in said regenerator;

recycling said regenerated catalyst to said cracking reactor; and separating said cracked oil in a fractionator into streams of light hydrocarbon gases, catalytic naphtha, catalytic cycle oil, and decanted oil.

11. A hydrotreating process in accordance with claim 10 including:

conveying heavy gas oil from said pipestill vacuum tower into a catalytic feed hydrotreating unit;

conveying said vacuum gas oil from said resid vacuum tower to said catalytic feed hydrotreating unit;

feeding coker gas oil to said catalytic feed hydrotreating unit;

injecting hydrogen-rich gases into said catalytic feed hydrotreating unit;

conveying catalytic feed hydrotreating catalyst to said catalytic feed hydrotreating unit;

hydrotreating said heavy gas oil, vacuum gas oil, and said coker gas oil with said hydrogen-rich gases in the presence of said catalytic feed hydrotreating catalyst in said catalytic feed hydrotreating unit to produce hydrotreated oil;

passing said hydrotreated oil to said cracking reactor; and catalytically cracking said hydrotreated oil in said cracking reactor in the presence of said cracking catalyst to produce cracked oil.

12. A hydrotreating process in accordance with claim 11 wherein said solvent-extracted oil is hydrotreated in said catalytic feed hydrotreater before being catalytically cracked in said cracking reactor.

13. A hydrotreating process in accordance with claim 10 including passing at least part of said decanted oil from said fractionator to said resid hydrotreating unit part of said feed.

14. A resid hydrotreating process in accordance with claim 10 including passing at least part of said decanted oil from said fractionator to at least one tower selected from the group consisting of said atmospheric tower and said resid vacuum tower, to help decrease the amount and size of asphaltenes in said tower bottoms.

15. A hydrotreating process in accordance with claim 9 wherein a substantial portion of said asphaltenes from said solvent extraction unit is conveyed to and coked in a coker.

16. A hydrotreating process in accordance with claim 9 including:

separating and flashing said hydrotreated resid oil in a flash drum into streams of vapors and gases, flash drum oil, and flashed hydrotreated resid oil before said hydrotreated oil is separated in said atmospheric tower; and recycling at least part of said flash drum oil to said resid hydrotreating unit as part of said feed.

17. A hydrotreating process in accordance with claim 9 wherein the ratio of said solvent to said vacuum tower bottoms being fed into said multistage solvent extraction unit ranges from about 3:1 to about 20:1.

18. A hydrotreating process in accordance with claim 17 wherein said ratio ranges from about 8:1 to about 12:1 and said solvent extraction unit comprises a threestage solvent extraction unit.

19. A hydrotreating process comprising the steps of:
feeding a first stream comprising resid to a reactor;
feeding a second stream comprising recycled substantially deasphalted resins to said reactor;
feeding hydrotreating catalyst to said reactor;
injecting hydrogen-rich gases into said reactor;
hydrotreating said first stream comprising resid and said second stream comprising recycled resins with said hydrogen-rich gases in the presence of said hydrotreating catalyst under hydrotreating conditions to produce hydrotreated oil;
fractionating said hydrotreated oil in at least one fractionator selected from the group consisting of an atmospheric tower and a vacuum tower to produce gas oil and resid bottoms;
substantially separating said resid bottoms into one stream comprising asphaltenes and said second stream comprising said substantially deasphalted resins; and
recycling said second stream comprising said recycled deasphalted resins to said reactor.

20. A hydrotreating process in accordance with claim 19 wherein said separation includes separating substantially deasphalted oil from said resid bottoms, feeding said substantially deasphalted oil with said recycled substantially deasphalted solvent-extracted resins in said reactor.

* * * * *

UNITED STATES PATENT AND TRADEMARK OFFICE
CERTIFICATE OF CORRECTION

PATENT NO. : 5,013,427
DATED     : May 7, 1991
INVENTOR(S) : James F. Mosby, et al It is certified that error appears in the above-identified patent and that said Letters Patent is hereby corrected as shown below:

| Col. | Line | |
|---|---|---|
| Abstract | 1 | "if" should read --is--. |
| 11 | 4-5 | "Methanelean" should read --methane-lean--. |
| 16 | 7 | "int" should read --into--. |
| 18 | 1 | "430°F" should read --430 - °F--. |
| 23 | 20 | "Res'd" should read --Resid--. |
| 28 | 24 | "Sovent" should read --solvent--. |
| 30 | 14-15 | "unit part" should read --unit as part-- |
| 1 | 22 | "highvalue" should read --high-value--. |

Signed and Sealed this

Twenty-fifth Day of May, 1993

Attest:

MICHAEL K. KIRK

Attesting Officer     Acting Commissioner of Patents and Trademarks